United States Patent
Lee et al.

(10) Patent No.: US 9,826,253 B2
(45) Date of Patent: *Nov. 21, 2017

(54) METHOD FOR ENTROPY-ENCODING SLICE SEGMENT AND APPARATUS THEREFOR, AND METHOD FOR ENTROPY-DECODING SLICE SEGMENT AND APPARATUS THEREFOR

(71) Applicant: SAMSUNG ELECTRONICS CO., LTD., Suwon-si (KR)

(72) Inventors: Tammy Lee, Seoul (KR); Byeong-doo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 129 days.

This patent is subject to a terminal disclaimer.

(21) Appl. No.: 14/759,330

(22) PCT Filed: Jan. 6, 2014

(86) PCT No.: PCT/KR2014/000093
§ 371 (c)(1),
(2) Date: Jul. 6, 2015

(87) PCT Pub. No.: WO2014/107065
PCT Pub. Date: Jul. 10, 2014

(65) Prior Publication Data
US 2015/0341668 A1    Nov. 26, 2015

Related U.S. Application Data

(60) Provisional application No. 61/748,964, filed on Jan. 4, 2013.

(51) Int. Cl.
*H04N 7/12* (2006.01)
*H04N 19/91* (2014.01)
(Continued)

(52) U.S. Cl.
CPC ............ *H04N 19/91* (2014.11); *H04N 19/14* (2014.11); *H04N 19/172* (2014.11);
(Continued)

(58) Field of Classification Search
None
See application file for complete search history.

(56) References Cited

U.S. PATENT DOCUMENTS 8,604,950 B2    12/2013 Sekiguchi et al.
8,953,682 B2    2/2015 Chen et al.
(Continued)

FOREIGN PATENT DOCUMENTS

KR    1020040019010 A    3/2004
KR    10-2011-0017719 A    2/2011
(Continued)

OTHER PUBLICATIONS

Communication dated Aug. 3, 2016, from the State Intellectual Property Office of People's Republic of China in counterpart Application No. 201480012100.4.
(Continued)

*Primary Examiner* — Mehrdad Dastouri
*Assistant Examiner* — Samuel D Fereja
(74) *Attorney, Agent, or Firm* — Sughrue Mion, PLLC

(57) ABSTRACT

Provided are entropy encoding and entropy decoding for video encoding and decoding.
The video entropy decoding method includes: determining a bin string and a bin index for a maximum coding unit that is obtained from a bitstream; determining a value of a syntax element by comparing the determined bin string with bin strings that is assignable to the syntax element in the bin index; storing context variables for the maximum coding unit when the syntax element is a last syntax element in the maximum coding unit, a dependent slice segment is includable in a picture in which the maximum coding unit is included, and the maximum coding unit is a last maximum
(Continued)

coding unit in a slice segment; and restoring symbols of the maximum coding unit by using the determined value of the syntax element.

4 Claims, 22 Drawing Sheets

(51) Int. Cl.
    *H04N 19/14*     (2014.01)
    *H04N 19/174*     (2014.01)
    *H04N 19/172*     (2014.01)
    *H04N 19/68*     (2014.01)
    *H04N 19/70*     (2014.01)
    *H04N 19/50*     (2014.01)

(52) U.S. Cl.
    CPC ........... *H04N 19/174* (2014.11); *H04N 19/50* (2014.11); *H04N 19/68* (2014.11); *H04N 19/70* (2014.11)

(56) References Cited

U.S. PATENT DOCUMENTS

| | | | |
|---|---|---|---|
| 9,049,450 | B2 | 6/2015 | Hong et al. |
| 9,294,781 | B2 | 3/2016 | Min et al. |
| 2009/0273491 | A1 | 5/2009 | Sakaguchi et al. |
| 2010/0098155 | A1 | 4/2010 | Demircin et al. |
| 2010/0142615 | A1 | 6/2010 | Han |
| 2011/0285560 | A1 | 11/2011 | Chang et al. |
| 2012/0106622 | A1* | 5/2012 | Huang .................. H04N 19/129 375/240.01 |
| 2012/0106652 | A1* | 5/2012 | Huang .................. H04N 19/70 375/240.25 |
| 2012/0189052 | A1 | 7/2012 | Karczewicz et al. |
| 2012/0230397 | A1* | 9/2012 | Ouedraogo ............ H04N 19/70 375/240.03 |
| 2012/0287993 | A1* | 11/2012 | Priddle .................. H04N 19/70 375/240.12 |
| 2013/0101035 | A1* | 4/2013 | Wang .................... H04N 19/70 375/240.12 |
| 2013/0202051 | A1* | 8/2013 | Zhou ..................... H04N 19/436 375/240.26 |
| 2013/0223528 | A1 | 8/2013 | Lim et al. |
| 2013/0272370 | A1* | 10/2013 | Coban .............. H04N 19/00521 375/240.01 |
| 2014/0098859 | A1 | 4/2014 | Lim et al. |
| 2014/0334557 | A1* | 11/2014 | Schierl .................. H04N 19/91 375/240.27 |
| 2014/0376643 | A1* | 12/2014 | Hendry ................. H04N 19/13 375/240.26 |
| 2015/0023409 | A1* | 1/2015 | Schierl .................. H04N 19/70 375/240.02 |
| 2015/0055715 | A1* | 2/2015 | Hendry ................ H04N 19/436 375/240.25 |
| 2015/0131738 | A1* | 5/2015 | Esenlik ................. H04N 19/70 375/240.16 |
| 2015/0341642 | A1* | 11/2015 | Hendry .................. H04N 19/13 375/240.02 |

FOREIGN PATENT DOCUMENTS

| | | |
|---|---|---|
| KR | 10-2011-0112180 A | 10/2011 |
| KR | 10-2012-0052882 A | 5/2012 |
| RU | 2329615 C2 | 7/2008 |
| WO | 2011/126285 A2 | 10/2011 |
| WO | 2012/134246 A2 | 10/2012 |

OTHER PUBLICATIONS

Communication dated Oct. 10, 2016, from the State Intellectual Property Office of People's Republic of China in counterpart Application No. 201510900319.4.
Communication dated Sep. 5, 2016, from the Russian Patent Office in counterpart application No. 2015132438/08.
Communication dated Sep. 5, 2016, from the Russian Patent Office in counterpart application No. 2015148954/08.
Communication dated Sep. 5, 2016, from the Russian Patent Office in counterpart application No. 2015148966/08.
Communication dated Sep. 5, 2016, from the Russian Patent Office in counterpart application No. 2015148997/08.
Communication dated Sep. 2, 2016, from the Russian Patent Office in counterpart application No. 2015148998/08.
Communication dated Aug. 31, 2015, issued by the Korean Intellectual Property Office in counterpart Korean Application No. 10-2014-0001505.
Communication dated Oct. 22, 2015, issued by the Korean Intellectual Property Office in counterpart Korean Application No. 10-2015-0086156.
Communication dated Oct. 22, 2015, issued by the Korean Intellectual Property Office in counterpart Korean Application No. 10-2015-0086155.
Communication dated Oct. 22, 2015, issued by the Korean Intellectual Property Office in counterpart Korean Application No. 10-2015-0086154.
Communication dated Oct. 22, 2015, issued by the Korean Intellectual Property Office in counterpart Korean Application No. 10-2015-0086153.
Communication dated Oct. 22, 2015, issued by the Korean Intellectual Property Office in counterpart Korean Application No. 10-2014-0001505.
T. Lee, et al.; "High-level parallelism clean-ups"; JCT-VC of ITU-T and ISO/IEC.JCTVC-L0116; Samsung Electronics Ltd.; Jan. 7, 2013; pp. 1-3.
B. Bross, et al.; "High Efficiency Video Coding (HEVC) text specification draft 9"; JCT-VC of ITU-T and ISO/IEC. JCTVC-K1003; Joint Collaborative Team on Video Coding (JCT-VC) of ITU-T SG16 WP3 and ISO/IEC JTC1/SC29/WG11; 11th Meeting: Shanghai, CN, Oct. 10-19, 2012; Ver. 13; Dec. 18, 2012; 316 pages total.
B. Bross. "Suggested bug-fixes for HEVC text specification draft 6"; JCT-VC of ITU-T and ISO/IEC. JCTVC-IO229; Joint Collaborative Team on Video Coding (JCT-VC) of ITU-T SG16 WP3 and ISO/IEC JTC1/SC29/WG11; Ver.7; May 6, 2012; 268 pages total.
Communication dated Jan. 4, 2016, issued by the Australian Intellectual Property Office in counterpart Australian Application No. 2015210372.
Communication dated Mar. 15, 2016, issued by the Australian Intellectual Property Office in counterpart Australian Application No. 2015210372.
Communication dated Jan. 27, 2016, issued by the Australian Intellectual Property Office in counterpart Australian Application No. 2015210367.
Communication dated Jan. 22, 2016, issued by the Australian Intellectual Property Office in counterpart Australian Application No. 2015210370.
Communication dated Jan. 13, 2016, issued by the Australian Intellectual Property Office in counterpart Australian Application No. 2015210371.
Benjamin Bross et al., "Proposed Editorial Improvements for High efficiency video coding (HEVC) Text Specification Draft 8", JCTVC-K0030 v6, Joint Collaborative Team on Video Coding (JCT-VC) of ITU-T SG16 WP3 and ISO/IEC JTC1/SC29/WG11, 11th Meeting: Shanghai, CN, Oct. 10-19, 2012, Total 276 pages.
Il-Koo Kim et al., "Block Partitioning Structure in the HEVC Standard", IEEE Transactions on Circuits and Systems for Video Technology, vol. 22, No. 12, pp. 1697-1706, Dec. 2012, pp. 1697-1706.
Benjamin Bross et al., "Proposed editorial improvements for High Efficiency Video Coding (HEVC) text specification draft 9 (SoDIS)", JCTVC-L0030, Joint Collaborative Team on Video Coding (JCT-VC) of ITU-T SG16 WP3 and ISO/IEC JTC1/SC29/WG11, 12th Meeting: Geneva, CH, version 1 published Jan. 3, 2013, Total 319 pages.

(56) References Cited

OTHER PUBLICATIONS

Tammy Lee et al., "On dependent slices", JCTVC-J0217, Joint Collaborative Team on Video Coding (JCT-VC) of ITU-T SG16 WP3 and ISO/IEC JTC1/SC29/WG11, 10th Meeting: Stockholm, SE, Jul. 11-20, 2012, Total 5 pages.
Communication dated Jan. 28, 2016, issued by the European Patent Office in counterpart European Application No. 14735308.0.
Communication dated Feb. 18, 2016, issued by the European Patent Office in counterpart European Application No. 14735308.0.
Gary J Sullivan et al., "Meeting Report of 12th Meeting of the Joint Collaborative Team on Video Coding (JCT-VC), Geneva, CH, Jan. 14-23, 2013", 12. JCT-VC Meeting; 103. MPEG Meeting; (Joint Collaborative Team on Video Coding of ISO/IEC JTC1/SG29/WG11 and ITU-T SG.16); Apr. 17, 2013, Total 190 pages, XP030113946, URL: http://wftp3.itu.int/av-arch/jctvc-site/,, No. JCTVC-L1000.
Communication dated Feb. 8, 2016, issued by the European Patent Office in counterpart European Application No. 15182831.6.
Communication dated Feb. 8, 2016, issued by the European Patent Office in counterpart European Application No. 15182832.4.
Communication dated Feb. 8, 2016, issued by the European Patent Office in counterpart European Application No. 15182833.2.
Communication dated Feb. 16, 2016, issued by the European Patent Office in counterpart European Application No. 15182830.8.
Communication dated Mar. 15, 2016, issued by the Japanese Intellectual Property Office in counterpart Japanese Application No. 2015-551608.
Communication dated Mar. 15, 2016, issued by the Japanese Intellectual Property Office in counterpart Japanese Application No. 2016-009536.
Communication dated Mar. 15, 2016, issued by the Japanese Intellectual Property Office in counterpart Japanese Application No. 2016-009537.
Communication dated Mar. 15, 2016, issued by the Japanese Intellectual Property Office in counterpart Japanese Application No. 2016-009538.
Communication dated Mar. 15, 2016, issued by the Japanese Intellectual Property Office in counterpart Japanese Application No. 2016-009539.
T. Schierl et al., "Dependent Slices", Joint Collaborative Team on Video Coding (JCT-VC) of ITU-T SG16 WP3 and ISO/IEC JTC1/SC29/WG11 9th Meeting; Geneva, CH, Apr. 27-May 7, 2012, JCTVC-I0229, Total 11 pages.
Search Report and Written Opinion dated Apr. 21, 2014 by the International Searching Authority in counterpart International Patent Application No. PCT/KR2014/000093.
Benjamin Bross et al.; "High Efficiency Video Coding (HEVC) text specification draft 9"; Joint Collaborative Team on Video Coding (JCT-VC) of ITU-T SG16 WP3 and ISO/IEC JTC1/SC29/WG11; Oct. 2012; 283 pages total.
Communication dated Feb. 3, 2017 issued by the State Intellectual Property Office of P.R. China in counterpart Chinese Patent Application No. 201510900716.1.
Communication dated Feb. 3, 2017 issued by the State Intellectual Property Office of P.R. China in counterpart Chinese Patent Application No. 201510902815.3.
Benjamin Bross et al; "High efficiency video coding (HEVC) text specification draft 7"; Joint Collaborative Team on Video Coding (JCT-VC) of ITU-T SG16 WP3 and ISO/IEC JTC1/SC29/WG11 $9^{th}$ Meeting: Geneva, CH. Apr. 27-May 7, 2012; Document JCTVC-I1003-d9; 278 pgs. total.
Communication dated Jul. 24, 2017 issued by the European Patent Office in counterpart European Patent Application No. 14735308.0.
Communication dated Jul. 25, 2017 issued by the European Patent Office in counterpart European Patent Application No. 15182832.4.
Communication dated Jul. 25, 2017 issued by the European Patent Office in counterpart European Patent Application No. 15182833.2.
Communication dated Jul. 18, 2017 issued by the Japanese Patent Office in counterpart Japanese Patent Application No. 2016-158928.
Seung-Hwan Kim, et al; "AHG4: on entry point coding"; Joint Collaborative Team on Video Coding (JCT-VC) of ITU-T SG 16 WP 3 and ISO/IEC JTC 1/SC 29/WG 11 10th Meeting: Stockholm, SE; Jul. 11-20, 2012; Sharp; Document: JCTVC-J0299; WG11 No. m25627; 5 pgs. total.

\* cited by examiner

FIG. 7

```
                                                          70
71 ─  slice_segment_header( ) {
72 ─    ...
73 ─    if( tiles_enabled_flag || entropy_coding_sync_enabled_flag ) {
          num_entry_point_offsets
          if( num_entry_point_offsets > 0 ) {
            offset_len_minus1
74 ─        for( i = 0; i < num_entry_point_offsets; i++ )
75 ─          entry_point_offset_minus1[ i ]
          }
        }
        ...
      }
```

INFORMATION ABOUT PARTITION TYPE (800)

INFORMATION ABOUT PREDICTION MODE (810)

INFORMATION ABOUT SIZE OF TRANSFORMATION UNIT (820)

CODING UNIT (1010)

CODING UNIT (1060)

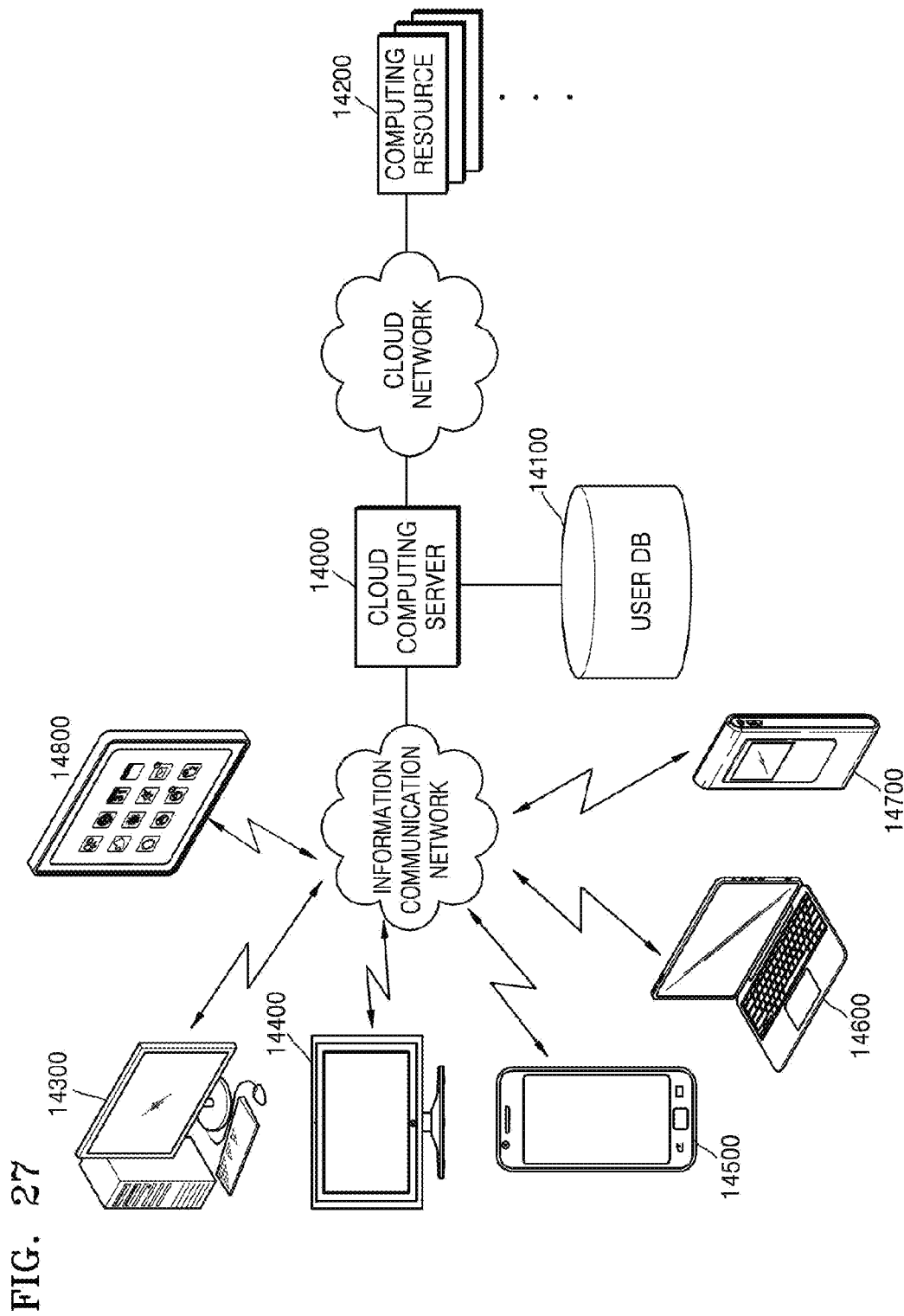

METHOD FOR ENTROPY-ENCODING SLICE SEGMENT AND APPARATUS THEREFOR, AND METHOD FOR ENTROPY-DECODING SLICE SEGMENT AND APPARATUS THEREFOR

CROSS-REFERENCE TO RELATED APPLICATIONS

This application is a National Stage of International Application No. PCT/KR2014/000093 filed on Jan. 6, 2014, claiming the benefit of U.S. Provisional Application No. 61/748,964 filed on Jan. 4, 2013, the contents of which are incorporated herein by reference in their entirety.

BACKGROUND

1. Field

Methods and apparatuses consistent with exemplary embodiments relate to entropy encoding and entropy decoding for video encoding and decoding.

2. Related Art

As hardware for reproducing and storing high-resolution or high-quality video content has been developed and supplied, a need for a video codec that effectively encodes or decodes high-resolution or high-quality video content has increased. Generally, a video is encoded according to a limited encoding method based on a macroblock having a predetermined size.

Image data of a spatial domain is transformed into coefficients of a frequency domain by using frequency transformation. A video codec splits an image into blocks each having a predetermined size in order to rapidly perform frequency transformation, performs DCT transformation on each of the blocks, and encodes frequency coefficients in units of the blocks. The coefficients of the frequency domain may be more easily compressed than the image data of the spatial domain. In particular, since an image pixel value of a spatial domain is expressed as a prediction error through inter prediction or intra prediction of a video codec, when frequency transformation is performed on the prediction error, a large data amount may be transformed into zero (0). A video codec reduces the data amount by replacing data which is continuously repeatedly generated with data having a smaller size.

Entropy encoding is performed in order to compress a bit string of a symbol generated by video encoding. Arithmetic coding-based entropy encoding has recently been widely used. In order to perform arithmetic coding-based entropy encoding, symbols are digitized to a bit string and context-based arithmetic coding is performed on the bit string.

SUMMARY

Exemplary embodiments provide entropy encoding and decoding methods using context information of nearby data in consideration of an attribute of a slice segment, for video encoding and decoding.

According to an aspect of an exemplary embodiment, a video entropy decoding method includes: determining a bin string and a bin index for a maximum coding unit that is obtained from a bitstream; determining a value of a syntax element by comparing the determined bin string with bin strings that may be assigned to the syntax element in the bin index; when the syntax element is a last syntax element in the maximum coding unit, a dependent slice segment may be included in a picture in which the maximum coding unit is included, and the maximum coding unit is a last maximum coding unit in a slice segment, storing context variables for the maximum coding unit; and restoring symbols of the maximum coding unit by using the determined value of the syntax element.

According to an aspect of an exemplary embodiment, a video entropy decoding method includes: determining a bin string and a bin index for a maximum coding unit that is obtained from a bitstream; determining a value of a syntax element by comparing the determined bin string with bin strings that are assignable to the syntax element in the bin index; storing context variables for the maximum coding unit when the syntax element is a last syntax element in the maximum coding unit, a dependent slice segment is includable in a picture in which the maximum coding unit is included, and the maximum coding unit is a last maximum coding unit in a slice segment; and restoring symbols of the maximum coding unit by using the determined value of the syntax element.

The storing of the context variables according to various exemplary embodiments may include storing the context variables for the maximum coding unit when the dependent slice segment is includable in the picture, irrespective of whether the slice segment is an independent slice segment or the dependent slice segment.

The video entropy decoding method according to various exemplary embodiments may further include using the stored context variables for entropy decoding of a context variable of a first maximum coding unit of the dependent slice segment, wherein the dependent slice segment is among slice segments included in the picture and is located next to the slice segment.

The video entropy decoding method according to various exemplary embodiments may further include: determining whether the dependent slice segment is includable in the picture based on first information that is obtained from a picture parameter set of the bitstream; determining whether the maximum coding unit is the last maximum coding unit in the slice segment based on second information that is obtained from data about the maximum coding unit, wherein the data about the maximum coding unit is included among data corresponding to slice segments of the bitstream; and obtaining the bin string from the data about the maximum coding unit.

The video entropy decoding method according to various exemplary embodiments may further include: determining a number of entry points of subsets that are included in the slice segment based on third information that is obtained from a slice segment header of the bitstream; determining a position of each of the entry points by using an offset and a number indicated by fourth information, wherein the offset is a number that is greater than the number indicated by the fourth information by 1, and the fourth information is obtained from the slice segment header of the bitstream and indicates an offset according to each entry point; and wherein the number of entry points and the positions of the entry points are determined when a tile is includable in a slice segment that is included in the picture or a synchronization operation is performable for context variables of a maximum coding unit that is included in the picture.

According to an aspect of an exemplary embodiment, a video entropy encoding method includes: generating a bit string of symbols that are determined by encoding a maximum coding unit; determining a context variable according to each bin index of a syntax element value corresponding to the symbols; determining a bin string indicating the syntax element value based on a context value of a syntax element; and storing context variables for the maximum coding unit when the syntax element is a last syntax element in the maximum coding unit, a dependent slice segment is includable in a picture in which the maximum coding unit is included, and the maximum coding unit is a last maximum coding unit in a slice segment.

The storing of the context variables according to various exemplary embodiments may include storing the context variables for the maximum coding unit when the dependent slice segment is includable in the picture, irrespective of whether the slice segment is an independent slice segment or the dependent slice segment.

According to an aspect of an exemplary embodiment, a video entropy decoding apparatus includes: a context initializer that determines a bin string and a bin index for a maximum coding unit that is obtained from a bitstream, and determines a value of a syntax element by comparing the determined bin string with bin strings that are assignable to the syntax element in the bin index; a context storage unit that stores context variables for the maximum coding unit when the syntax element is a last syntax element in the maximum coding unit, a dependent slice segment is includable in a picture in which the maximum coding unit is included, and the maximum coding unit is a last maximum coding unit in a slice segment; and a symbol restoration unit that restores symbols of the maximum coding unit by using the determined value of the syntax element.

According to an aspect of an exemplary embodiment, a video entropy encoding apparatus includes: a binarizer that generates a bit string of symbols that are determined by performing encoding on a maximum coding unit; a bin string determiner that determines a context value according to each bin index of a syntax element value corresponding to the symbols and determines a bin string indicating the syntax element value based on a context variable of a syntax element; and a context storage unit that stores context variables for the maximum coding unit when the syntax element is a last syntax element in the maximum coding unit, a dependent slice segment is includable in a picture in which the maximum coding unit is included, and the maximum coding unit is a last maximum coding unit in a slice segment.

According to an aspect of an exemplary embodiment, a computer-readable recording medium having instructions embodied thereon a program, which, when executed by a computer performs the video entropy decoding method is provided.

According to an aspect of an exemplary embodiment, a computer-readable recording medium having instructions embodied thereon a program, which, when executed by a computer, performs the video entropy encoding method is provided.

Thus, if a dependent slice segment may be used in a current picture based on entropy encoding/decoding, a context variable may be stored after entropy encoding (decoding) of a last maximum coding unit (LCU) of each slice segment is completed. Accordingly, although a previous slice segment is an independent slice segment, an initial variable of the context variable that is necessary for a next dependent slice segment may be obtained from the context variable of the last LCU of the independent slice segment that is previously encoded Since information indicating a number that is less by 1 than a subset offset is provided through a slice segment in order to efficiently inform of a synchronization point of a context variable for entropy encoding/decoding, a data size of the slice segment may be reduced.

BRIEF DESCRIPTION OF THE DRAWINGS

FIG. 7 is a diagram illustrating a syntax of a slice segment header according to an exemplary embodiment.

FIG. 27 is a diagram illustrating a network structure of a cloud computing system using a video encoding apparatus and a video decoding apparatus according to an exemplary embodiment.

DETAILED DESCRIPTION OF EXEMPLARY EMBODIMENTS

An entropy encoding method in a slice segment and an entropy decoding method in a slice segment according to various exemplary embodiments will be explained with reference to FIGS. 1A through 7. A video encoding method and a video decoding method based on coding units having a tree structure according to various exemplary embodiments to which the entropy encoding method and the entropy decoding method may be applied will be explained with reference to FIGS. 8 through 20. In addition, various exemplary embodiments to which the video encoding method and the video decoding method may be applied will be explained with reference to FIGS. 21 through 27. Hereinafter, the term 'image' may refer to a still image or a moving image, that is, a video itself.

Figure 1A:
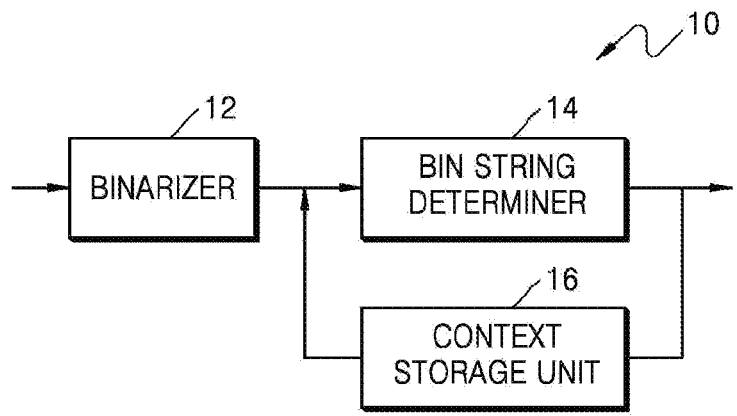
FIG. 1A is a block diagram illustrating a video entropy encoding apparatus according to one or more exemplary embodiments.

FIG. 1A is a block diagram of a video entropy encoding apparatus 10 according to various exemplary embodiments.

The video entropy encoding apparatus 10 according to various exemplary embodiments includes a binarizer 12, a bin string determiner 14, and a context storage unit 16.

The video entropy encoding apparatus 10 may perform entropy encoding on symbols that are encoded according to maximum coding units (LCUs). The video entropy encoding apparatus 10 may store a video encoder (not shown) that performs encoding on LCUs.

A process used by the video entropy encoding apparatus 10 including the video encoder (not shown) to perform encoding on LCUs and generate symbols will now be explained in detail for convenience of explanation. However, it will be understood that the video entropy encoding apparatus 10 is not limited to a structure directly including the video encoder (not shown) and the video entropy encoding apparatus 10 may receive symbols that are encoded by an external encoding apparatus.

A video encoding process according to an exemplary embodiment may be divided into a source encoding process that minimizes redundant data due to spatio-temporal similarity of image data and an entropy encoding process that minimizes redundancy again in a bit string of data that is generated through the source encoding process. The video entropy encoding apparatus 10 according to an exemplary embodiment performs source encoding on each of pictures that constitute a video according to blocks and generates encoded symbols. The source encoding includes a process of performing intra prediction/inter prediction, transformation, and quantization on video data in a space domain in units of blocks. As a result of the source encoding, encoded symbols according to blocks may be generated. Examples of the encoded symbols may include a quantized transform coefficient of a residual component, a motion vector, an intra mode attribute, an inter mode attribute, and a quantization parameter.

Entropy encoding according to an exemplary embodiment may be divided into a binarization process that transforms symbols into a bit string and an arithmetic encoding process that performs context-based arithmetic coding on the bit string. Context adaptive binary arithmetic coding (CABAC) is widely used as an encoding method that performs context-based arithmetic coding. According to context-based arithmetic encoding/decoding, each bit of a symbol bit string may be each bin, and each bit position may be mapped to a bin index. A length of a bit string, that is, a length of bins, may vary according to a symbol value. For context-based arithmetic encoding/decoding, context modeling that determines a context of a symbol is necessary.

For context modeling, a context needs to be newly updated for each bit position of a symbol bit string, that is, for each bin index. The term 'context modeling' refers to a process of analyzing a probability that each bin is 0 or 1. A process of updating a context by reflecting a result obtained by analyzing a probability of each of symbols of a new block according to bits on a current context may be repeatedly performed in units of blocks. A probability table in which a probability is matched to each bin may be provided as information containing a result of such context modeling. Entropy coding probability information according to an exemplary embodiment may be information containing a result of context modeling.

Accordingly, once context modeling information, that is, entropy coding probability information, is obtained, entropy encoding may be performed by assigning a code to each of bits of a binarized bit string of block symbols based on a context of the entropy coding probability information.

Since entropy encoding involves context-based arithmetic encoding/decoding, symbol code context information may be updated in units of blocks, and since entropy encoding is performed by using the updated symbol code context information, a compression ratio may be increased.

A video encoding method according to various exemplary embodiments should not be construed as limited to only a video encoding method performed on a 'block' that is a data unit, and may be applied to various data units.

For efficiency of image encoding, an image is split into blocks each having a predetermined size and then is encoded. The block may have a perfect square or rectangular shape or an arbitrary geometric shape. The present exemplary embodiment is not limited a data unit having a predetermined size. The block according to an exemplary embodiment may be an LCU, a coding unit, a prediction unit, or a transformation unit, from among coding units having a tree structure. A video encoding/decoding method based on the coding units according to the tree structure will be explained below with reference to FIGS. 8 through 20.

Blocks of a picture are encoded in a raster scan direction.

The video entropy encoding apparatus 10 may split a picture into one or more tiles, and each of the tiles may include blocks that are arranged in a raster direction from among blocks of the picture. The picture may be split into tiles that are split into one or more columns, tiles that are split into one or more rows, or tiles that are split into one or more columns and one or more rows. Each of the tiles may split a spatial domain into subdomains. In order to individually encode each of the subdomains, the video entropy encoding apparatus 10 may individually perform encoding in units of tiles.

Since each slice segment includes blocks that are arranged in the raster direction, the video entropy encoding apparatus 10 may generate a slice segment by splitting a picture in a horizontal direction. The picture may be split into one or more slice segments. Data of each slice segment may be transmitted through one network adaptation layer (NAL) unit.

The video entropy encoding apparatus 10 according to an exemplary embodiment may perform encoding on slice segments. The video entropy encoding apparatus 10 according to an exemplary embodiment may generate encoded symbols according to blocks by sequentially performing encoding on blocks that are included in each of the slice segments. Encoded data of blocks in each slice segment may be included in and may be transmitted through one NAL Unit. Each tile may include at least one slice segment. If necessary, each slice segment may include at least one tile.

A slice segment may be classified into a dependent slice segment and an independent slice segment.

If a current slice segment is a dependent slice segment, in-picture prediction that refers to encoded symbols of a previous slice segment that is encoded earlier than the current slice segment may be performed. When a current slice segment is a dependent slice segment, dependent entropy encoding that refers to entropy information of a previous slice segment that is encoded earlier than the current slice segment may be performed.

If a current slice segment is an independent slice segment, in-picture prediction that refers to a previous slice segment is not performed and entropy information of the previous slice segment is not referred to.

One picture according to an exemplary embodiment may include one independent slice segment and at least one dependent segment that are subsequent to an independent slice segment in a raster scan order. One independent slice segment may be one slice.

The video entropy encoding apparatus 10 according to an exemplary embodiment may individually perform encoding on each tile, apart from other tiles. The video entropy encoding apparatus 10 may sequentially encode LCUs that are included in a current tile, according to tiles.

The video entropy encoding apparatus 10 according to an exemplary embodiment may encode LCUs of a current slice segment according to slice segments. LCUs that are included in a predetermined tile from among the LCUs that are included in the current slice segment may be encoded in an encoding order of a current tile.

If all of LCUs of a current slice segment belong to a current tile, the video entropy encoding apparatus 10 according to an exemplary embodiment may encode the plurality of LCUs that are included in the current slice segment in a raster scan order in the current tile. In this case, since the current slice segment is not located across a border of the current tile, the LCUs of the current slice segment do not cross the border of the current tile. In this case, the video entropy encoding apparatus 10 according to an exemplary embodiment may sequentially perform encoding on at least one slice segment that is included in each tile and may encode a plurality of blocks that are included in each slice segment in the raster scan order.

Even when a current slice segment includes at least one tile, the video entropy encoding apparatus 10 may perform encoding, in a raster scan order of LCUs of a current tile, on the LCUs that belong to the current tile from among LCUs that are included in the current slice segment. The video entropy encoding apparatus 10 according to an exemplary embodiment may sequentially perform encoding on slice segments. Accordingly, the video entropy encoding apparatus 10 according to an exemplary embodiment may generate encoded symbols according to blocks by sequentially performing encoding on the slice segments and sequentially performing encoding on blocks that are included in each of the slice segments. The video entropy encoding apparatus 10 may perform intra prediction, inter prediction, transformation, in-loop filtering, sample adaptive offset (SAO) compensation, and quantization in units of blocks of each slice segment.

In order to perform prediction encoding on encoded symbols that are generated during a source encoding process, for example, an intra sample, a motion vector, and coding mode information, in-picture prediction may be performed. When in-picture prediction is performed, a difference value between a current encoded symbol and a previous encoded symbol, instead of the current encoded symbol, may be encoded. A difference value between a current sample and a neighboring sample, instead of the current sample, may be encoded.

In order to perform prediction encoding on entropy context information or code context information that is generated during an entropy encoding process, dependent entropy encoding may be performed. When dependent entropy encoding is performed and current entropy information and previous entropy information are the same, encoding of the current entropy information may be omitted.

However, since the video entropy encoding apparatus 10 individually encodes each tile, in-picture prediction or dependent entropy encoding may not be performed between LCUs that belong to different tiles.

The video entropy encoding apparatus 10 may record information indicating availability of a slice segment or an attribute of the slice segment on headers of various coding units such as a sequence parameter set (SPS), a picture parameter set (PPS), and a slice segment header.

For example, the video entropy encoding apparatus 10 may generate a slice segment header including information indicating whether a current slice segment is an initial slice segment in a current picture.

Various basic information about a current picture to which a current slice segment belongs may be contained in and may be transmitted through a PPS. In particular, the PPS may include information about whether the current picture may include a dependent slice segment. Accordingly, when information indicating that the dependent slice segment is used in the current picture is contained in the PPS, the video entropy encoding apparatus 10 may include, in a current slice segment header, information indicating whether the current slice segment is the dependent slice segment using slice header information of a previous slice segment.

In contrast, when information indicating that a dependent slice segment is not used in a current picture is included in a PPS of the current picture, information indicating whether the current slice segment is the dependent slice segment is not included in a current slice segment header.

When a current slice segment is not an initial slice segment, the video entropy encoding apparatus 10 may add information indicating whether the current slice segment is a dependent slice segment to a slice segment header.

That is, when information indicating that a dependent slice segment is used in a current picture is included in a PPS of the current picture and information indicating that a current slice segment is not an initial slice segment is included in a current slice segment header, information indicating whether the current slice segment is the dependent slice segment may be further added to the current slice segment header. The initial slice segment according to an exemplary embodiment has to be an independent slice segment. Accordingly, when the current slice segment is the initial slice segment, information indicating whether the current slice segment is the dependent slice segments may be omitted. Accordingly, the video entropy encoding apparatus 10 may add information indicating whether the current slice segment is the initial slice segment to the slice segment header for the initial slice segment and then may add basic information about the current slice segment to the slice segment header, and may transmit resultant information.

Accordingly, when a dependent slice segment may be used in a current picture and a current slice segment is not an initial slice segment, information indicating whether the current slice segment is the dependent slice segment may be further added to a current slice segment header.

However, when a current slice segment is a dependent slice segment, not an initial slice segment, basic information about a slice segment may be the same as information of a previous slice segment header. Accordingly, a current slice segment header may be transmitted while including information indicating whether the current slice segment is the initial slice segment and information indicating whether the current slice segment is the dependent slice segment but omitting information that is the same as the information of the previous slice segment header.

When a current slice segment according to an exemplary embodiment is not a dependent slice segment, a current slice segment header may include information indicating whether the current slice segment is the dependent slice segment and may further include various header information for the current slice segment.

The video entropy encoding apparatus 10 may contain, in a slice segment header, a quantization parameter and initial context information of a context for entropy encoding and may transmit resultant information.

However, when a current slice segment is a dependent slice segment, the video entropy encoding apparatus 10 may perform in-picture prediction that refers to encoded symbols of a previous slice segment that is encoded earlier than the current slice segment. When a current slice segment is a dependent slice segment, the video entropy encoding apparatus 10 may perform dependent entropy encoding that refers to entropy information of a previous slice segment that is encoded earlier than the current slice segment.

Accordingly, when a current slice segment is a dependent slice segment, the video entropy encoding apparatus 10 does not contain a quantization parameter and initial context information in a slice segment header of the current slice segment. This is because a quantization parameter and initial context information of the dependent slice segment may be initialized to a quantization parameter and initial context information that are contained in header information of an independent slice segment that is previously encoded.

When a current slice segment is an independent slice segment, since in-picture prediction is not performed, the video entropy encoding apparatus 10 may output a bit string of encoded symbols of the current slice segment, irrespective of a previous slice segment. When a current slice segment is an independent slice segment, the video entropy encoding apparatus 10 may output entropy information of the current slice segment, irrespective of entropy information of a neighboring slice segment that is previously encoded. For example, when a current slice segment is an independent slice segment, a quantization parameter and initial context information have to be contained in a current slice segment header.

The video entropy encoding apparatus 10 may transmit a slice segment header and symbols of a slice segment, according to slice segments.

An operation for video entropy encoding performed by each of elements of the video entropy encoding apparatus 10 will now be explained in detail with reference to FIG. 1B.

Figure 1B:
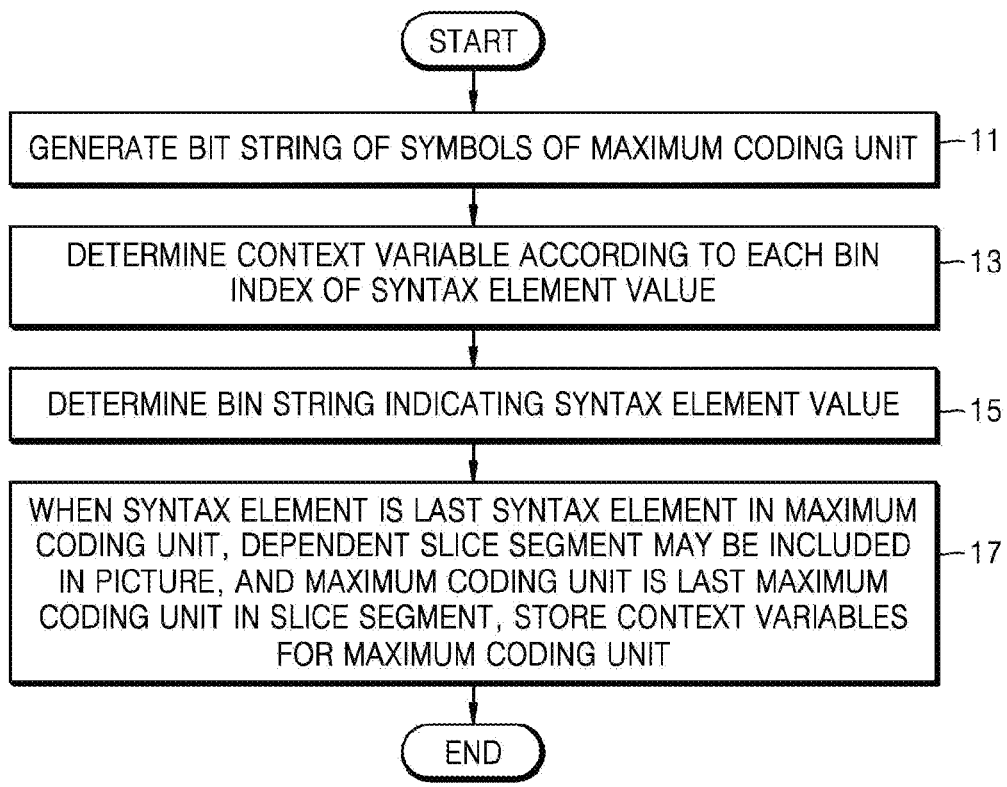
FIG. 1B is a flowchart of a video entropy encoding method according to one or more exemplary embodiments.

FIG. 1B is a flowchart of a video entropy encoding method according to various exemplary embodiments.

The video entropy encoding apparatus 10 may split a picture into at least one slice segment, may perform encoding on each slice segment, and may sequentially perform encoding on LCUs that are included in each slice segment.

In operation 11, the binarizer 12 may perform binarization on symbols that are determined by performing encoding on an LCU to generate a bit string of the symbols.

In operation 13, the bin string determiner 14 may determine a context variable according to each bin index of a syntax element value corresponding to the symbols of the LCU. A context variable for a current LCU may be determined based on a context variable according to each bin index of a syntax element value that is used in another LCU that is previously encoded.

Each context variable may include a context table and a context index. A context variable may be determined according to a syntax element.

In operation 15, the bin string determiner 14 may determine a bin string indicating the syntax element value based on the determined context variable of a syntax element. The video entropy encoding apparatus 10 may store data about a context table containing a correlation between the bin string and a context variable for each syntax element.

The bin string determiner 14 may adopt a bin string indicated by the context variable that is determined in operation 13, in the context table for a current syntax element value.

The video entropy encoding apparatus 10 may generate a bin string for all syntax elements for the LCU, and then may determine whether to store context variables that are determined according to the LCU.

In operation 17, when the syntax element is a last syntax element in the LCU, a dependent slice segment may be included in a picture in which the LCU is included, and the LCU is a last LCU in a slice segment, the context storage unit 16 may store context variables for the LCU.

Irrespective of whether the slice segment is an independent slice segment or a dependent slice segment, when a dependent slice segment may be included in the picture, the context storage unit 16 may store the context variables for the LCU.

When a plurality of slice segments are included in the picture, for entropy encoding of a context variable of a first LCU of a dependent slice segment that is located next to a current slice segment, context variables that are stored in the current slice segment may be used.

The video entropy encoding apparatus 10 may generate a PPS containing a slice segment that is included in a picture, an LCU, and various information that is commonly necessary to decode the LCU. The video entropy encoding apparatus 10 may include, in the PPS, first information indicating whether a dependent slice segment may be included in the picture.

The video entropy encoding apparatus 10 may generate slice segment data including data that is generated by encoding LCUs that are included in each slice segment. The video entropy encoding apparatus 10 may include, in data about an LCU from among data according to slice segments, second information indicating whether the LCU is a last LCU in the slice segment. A bin string that is generated by entropy encoding may be included in the data about the LCU.

The video entropy encoding apparatus 10 may generate a slice segment header including an LCU that is included in a slice segment and various information that is commonly necessary to decode LCUs. The video entropy encoding apparatus 10 may generate a bitstream including a PPS, a slice segment header, and data according to slice segments, as a result of encoding performed on the slice segments.

When a tile may be included in a slice segment that is included in a picture or a synchronization operation may be performed for context variables of an LCU that is included in the picture, the video entropy encoding apparatus 10 may include, in a slice segment header, third information indicating a number of entry points of subsets that are included in the slice segment and fourth information indicating a number that is less by 1 than an offset according to each entry point.

The term 'subset that is included in a slice segment' refers to a group of LCUs that are sequentially encoded in a scan order, from among LCUs that are included in the slice segment. Processing of the subsets may be performed simultaneously.

A first byte of a current subset may be determined by summing subset offsets from a previous subset to the current subset by using the fourth information that is assigned to each subset. When there exist two or more subsets, since a subset offset has to be greater than 0, the fourth information indicating the subset offset may be obtained by subtracting 1 from the subset offset. Accordingly, an actual subset offset may be a value that is greater by 1 than a number indicated by the fourth information.

An index of bytes that constitute each subset starts with 0 and a byte index indicating a first byte is 0. Accordingly, a last byte of a current subset may be determined by summing a first byte of the current subset with a number indicated by the fourth information that is assigned to the current subset.

The video entropy encoding apparatus 10 according to an exemplary embodiment may include a central processor (not shown) that generally controls the binarizer 12, the bin string determiner 14, and the context storage unit 16. Alternatively, each of the binarizer 12, the bin string determiner 14, and the context storage unit 16 may operate due to its own processor (not shown), and the video entropy encoding apparatus 10 may generally operate as the processors (not shown) organically operate. Alternatively, the video entropy encoding apparatus 10 may operate according to the control of an external processor (not shown) of the video entropy encoding apparatus 10 according to an exemplary embodiment.

The video entropy encoding apparatus 10 according to an exemplary embodiment may include one or more data storage units (not shown) in which input/output data of the binarizer 12, the bin string determiner 14, and the context storage unit 16 is stored. The video entropy encoding apparatus 10 may include a memory controller (not shown) that controls data input/output of the data storage units (not shown).

Figure 2A:
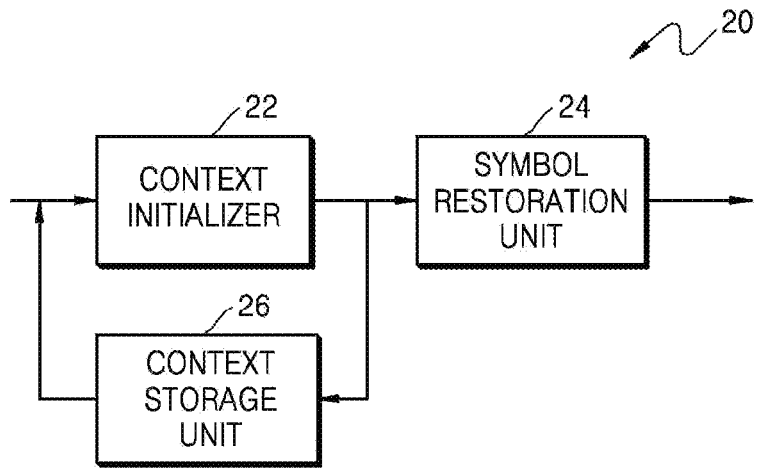
FIG. 2A is a block diagram illustrating a video entropy decoding apparatus according to one or more exemplary embodiments.

FIG. 2A is a block diagram of a video entropy decoding apparatus 20 according to various exemplary embodiments.

The video entropy decoding apparatus 20 according to an exemplary embodiment includes a context initializer 22, a symbol restoration unit 24 (e.g., a symbol restorer, etc.), and a context storage unit 26 (e.g., context storage, etc.).

The video entropy decoding apparatus 20 according to an exemplary embodiment may receive a bitstream that is generated as a result after a picture is split into two or more tiles and at least one slice segment and then is encoded. The bitstream may be data that is generated according to slice segments and may be data that is generated according to tiles.

Next, the video entropy decoding apparatus 20 may parse a slice segment header according to an attribute of a slice segment. The video entropy decoding apparatus 20 may parse information indicating whether a current slice segment is an initial slice segment in a current picture, from the slice segment header of the current slice segment.

When it is determined from the parsed information that the current slice segment is not the initial slice segment, the video entropy decoding apparatus 20 may further parse information indicating whether the current slice segment is a dependent slice segment that uses slice header information of a previous slice segment, from a current slice segment header.

However, information about whether the current picture may include the dependent slice segment may be parsed from a PPS for the current picture to which the current slice segment belongs. Accordingly, when information indicating that the dependent slice segment is used in the current picture is parsed from the PPS of the current picture, the video entropy decoding apparatus 20 may parse information indicating whether the current slice segment is the dependent slice segment, from the current slice segment header.

In contrast, when information indicating that the dependent slice segment is not used in the current picture is parsed from the PPS of the current picture, information indicating whether the current slice segment is the dependent slice segment is not parsed from the current slice segment header.

Accordingly, when information indicating that the dependent slice segment is used in the current picture is parsed from the PPS of the current picture and information indicating that the current slice segment is not the initial slice segment is parsed, the video entropy decoding apparatus 20 may further parse information indicating whether the current slice segment is the dependent slice segment, from the current slice segment header. That is, when it is determined that the current picture uses the dependent slice segment and the current dependent slice segment is not the initial slice segment, the video entropy decoding apparatus 20 may further parse information indicating whether the current slice segment is the dependent slice segment from the current slice segment header.

When it is determined from the parsed information that the current slice segment is the initial slice segment, the video entropy decoding apparatus 20 does not parse information indicating whether the current slice segment is the dependent slice segment from the current slice segment header. Since the initial slice segment may not be the dependent slice segment, it may be determined that the initial slice segment is an independent slice segment without the parsed information. Accordingly, when the current slice segment is the initial slice segment, the video entropy decoding apparatus 20 may further parse information indicating whether the current slice segment is the initial slice segment and basic information about the current slice segment from an initial slice segment header of the picture.

When it is determined from the information parsed from the current slice segment header that the current slice segment is the dependent slice segment, the video entropy decoding apparatus 20 may determine some header information that is parsed from a header of a previous slice segment as basic information of the current slice segment.

When it is determined from the information parsed from the current slice segment header that the current slice segment is not the dependent slice segment, the video entropy decoding apparatus 20 may parse various header information for the current slice segment from the current slice segment header.

The video entropy decoding apparatus 20 may decode the current slice segment by using the information parsed from the current slice segment header and symbols of the current slice segment.

When each slice segment is received through one NAL unit, the video entropy decoding apparatus 20 may receive encoded data of blocks according to slice segments. Each tile may include at least one slice segment. If necessary, a slice segment may include at least one tile. A relationship between a slice segment and a tile is the same as that described with reference to FIGS. 1A and 1B.

The video entropy decoding apparatus 20 including the restored current slice segment may restore at least one slice segment that is included in each tile and may restore the picture by combining restored tiles.

The video entropy decoding apparatus 20 may parse, in a raster scan order, symbols of a plurality of blocks that are included in the current slice segment, according to at least one slice segment that is included in a current tile, according to tiles. Further, the video entropy decoding apparatus 20 may decode, in the raster scan order, blocks by using the symbols that are parsed in the raster scan order of the blocks.

The video entropy decoding apparatus 20 may parse encoded symbols according to LCUs by performing entropy decoding on a bitstream of each slice segment. The video entropy decoding apparatus 20 may parse encoded symbols according to LCUs by sequentially performing entropy decoding on LCUs that are included in a slice segment. A process used by the video entropy decoding apparatus 20 to perform restoration by parsing encoded symbols according to coding units that are included in a slice segment will now be explained in detail with reference to FIG. 2B.

Figure 2B:
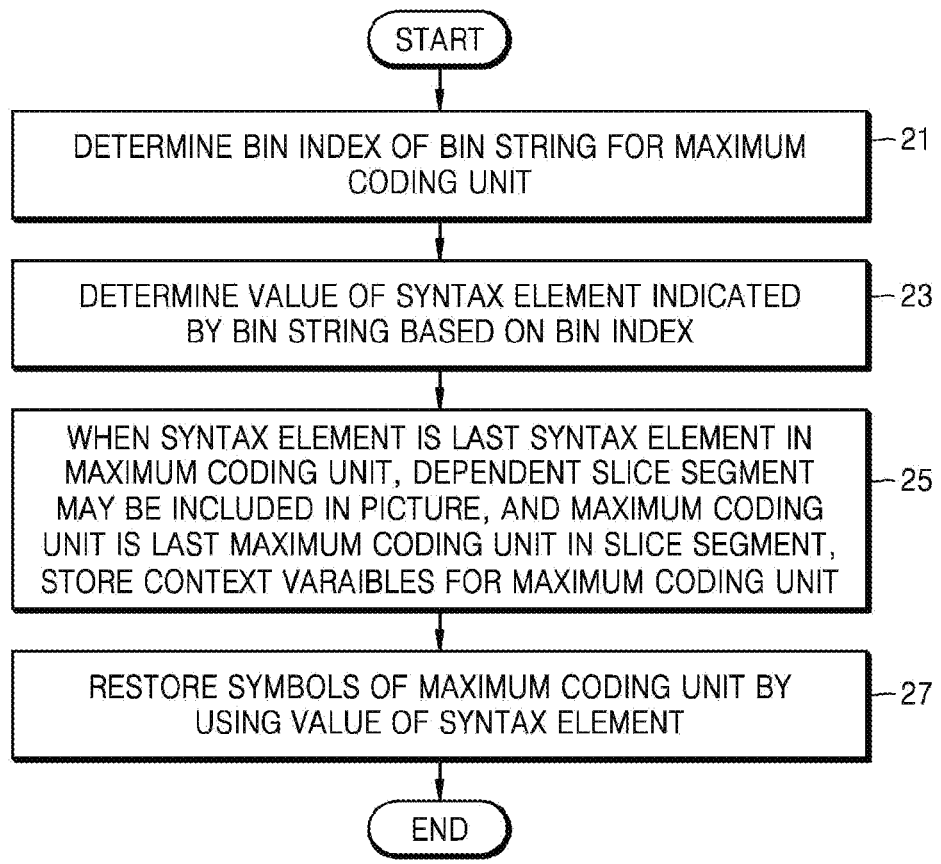
FIG. 2B is a flowchart of a video entropy decoding method according to one or more exemplary embodiments.

FIG. 2B is a flowchart of a video entropy decoding method according to various exemplary embodiments.

In operation 21, the context initializer 22 may determine a bin string and a bin index for an LCU that is obtained from a bitstream.

The context initializer 22 may store an initialization table for an initialization value according to each context index for each syntax element. According to an initialization operation of a context variable, a context index of a current syntax element may be determined to be an initialization value based on the initialization table.

The context initializer 22 may store data about the context table containing a correlation between a bin string and a context variable for each syntax element.

The context initializer 22 may determine the context variable for each syntax element. Context variables of a current LCU may be synchronized by using context variables of a nearby LCU.

In operation 23, the context initializer 22 may determine a value of a syntax element indicated by a current bin string by comparing bin strings that may be assigned to the syntax element in a current context variable based on the context table with the bin string in the bin index that is determined in operation 21.

Each context variable may be updated based on a context that is newly accumulated, from an initial context variable when entropy decoding of an LCU starts, during the entropy decoding performed on bin strings for the LCU.

The context initializer 22 may determine whether a dependent slice segment may be included in a picture based on first information that is obtained from a PPS of the bitstream. The context initializer 22 may determine whether the LCU is a last LCU in a slice segment based on second information that is obtained from data about the LCU from among data according to slice segments of the bitstream.

The context initializer 22 may obtain a bin string from the data about the LCU from among the data according to slice segments.

In operation 25, when the syntax element is a last syntax element in the LCU, the dependent slice segment may be included in the picture in which the LCU is included, and the LCU is a last LCU in the slice segment, the context storage unit 26 may store context variables for the LCU.

Irrespective of whether the slice segment is an independent slice segment or a dependent slice segment, when a dependent slice segment may be included in the picture, the context variables for the LCU may be stored.

When a plurality of slice segments are included in the picture, for entropy encoding for a context variable of a first LCU of a dependent slice segment that is located next to a current slice segment, context variables that is stored in the current slice segment may be used.

In operation 27, a symbol restoration unit 24 may restore symbols of the LCU by using the value of the syntax element that is determined in operation 23.

The video entropy decoding apparatus 20 may determine a number of entry points of subsets that are included in the slice segment based on third information that is obtained from a slice segment header of the bitstream.

The video entropy decoding apparatus 20 may determine a position of each of the entry points by using an offset that is a number that is greater by 1 than a number indicated by fourth information about an offset according to each entry point that is obtained from the slice segment header of the bitstream. Accordingly, since the video entropy decoding apparatus 20 may accurately determine an entry point for each subset such as a column of slice segments, titles, or LCUs, an entropy synchronization point at which a context variable of a nearby LCU is to be obtained may be accurately determined.

The video entropy decoding apparatus 20 may sequentially perform decoding, in a raster scan order, on each LCU by using encoded symbols of LCUs that are parsed for each slice segment in operations 21 through 27.

The video entropy decoding apparatus 20 may individually perform decoding on each tile, apart from other tiles. LCUs that are included in a current tile may be sequentially decoded according to tiles.

Accordingly, the video entropy decoding apparatus 20 may sequentially perform decoding, in the raster scan order, on each LCU by using encoded symbols of LCUs that are parsed for each slice segment.

LCUs that are included in a predetermined tile from among LCUs that are included in a current slice segment may be decoded according to a decoding order in a current tile.

When all of LCUs of a current slice segment belong to a current tile, the video entropy decoding apparatus 20 may decode, in the raster scan order in the current tile, the plurality of LCUs that are included in the current slice segment. In this case, the current slice segment is not located across a border of the current tile. The video entropy decoding apparatus 20 may sequentially decode at least one slice segment that is included in each tile, and may decode a plurality of blocks that are included in each slice segment in the raster scan order.

Even when a current slice segment includes at least one tile, the video entropy decoding apparatus 20 may perform decoding, in the raster scan order of LCUs of a current tile in the current tile, on LCUs of the current tile from among LCUs that are included in the current slice segment.

In-picture prediction may be performed by using encoded symbols such as an intra sample that is parsed according to LCUs, a motion vector, and coding mode information. Through the in-picture prediction, a restoration value of a current encoded symbol may be determined by synthesizing a restoration value of a previous encoded symbol with a difference value between the current encoded symbol and the previous encoded symbol. Further, a restoration value of a current sample may be determined by synthesizing a restoration value of a neighboring sample that is restored earlier than the current sample with a difference value between the current sample and the previous sample.

Decoding using encoded symbols of an LCU may be performed through inverse quantization, inverse transformation, and intra prediction/motion compensation. For example, transform coefficients of transformation units may be restored by performing inverse quantization on encoded symbols of each LCU, and residual information of prediction units may be restored by performing inverse transformation on the transform coefficients of the transformation units. Intra prediction may be performed by using an intra sample in the residual information. Samples of a current prediction unit may be restored through motion compensation that synthesizes the residual information with another restored prediction unit indicated by the motion vector. In addition, SAO compensation and in-loop filtering may be performed on LCUs.

Accordingly, the video entropy decoding apparatus 20 may sequentially decode LCUs of each slice segment and each tile according to a decoding order in a tile.

When a tile includes at least one slice segment according to an exemplary embodiment, one tile may be restored by decoding LCUs for each slice segment and combining restoration results of slice segments.

When a slice segment includes at least one tile according to an exemplary embodiment, one slice segment may be restored by decoding LCUs for each tile and combining restoration results of tiles.

The video entropy decoding apparatus 20 may restore a picture that is comprised of restored tiles or restored slice segments.

According to the entropy encoding/decoding methods of FIGS. 1A, 1B, 2A, and 2B, when a dependent slice segment may be used in a current picture, after entropy encoding (decoding) of a last LCU of each slice segment is completed, a context variable may be stored. Accordingly, even when a previous slice segment is an independent slice segment, an initial variable of a context variable that is necessary for a next dependent slice segment may be obtained from a context variable of a last LCU of an independent slice segment that is previously encoded.

Since information indicating a number that is less by 1 than a subset offset is provided to a slice segment in order to efficiently inform of a synchronization point of a context variable for entropy encoding/decoding, a data size of the slice segment may be reduced.

A relationship between a slice segment and a tile that are subdomains used by the video entropy encoding apparatus 10 and the video entropy decoding apparatus 20 according to an exemplary embodiment will now be explained with reference to FIGS. 3 and 4.

Figure 3:
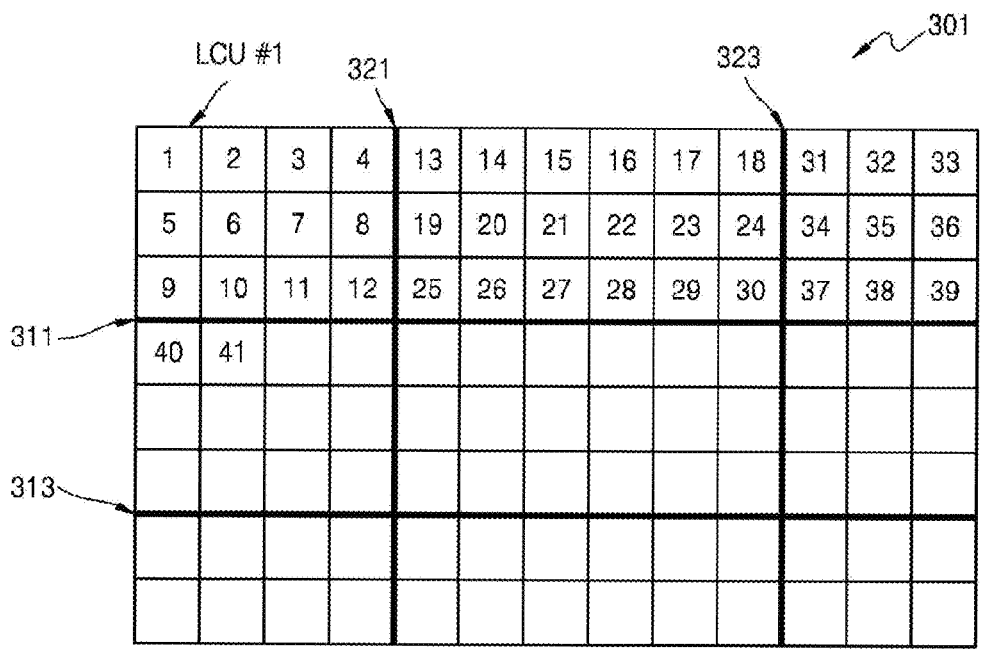
FIG. 3 is a diagram illustrating tiles and maximum coding units (LCUs) in a picture.

FIG. 3 is a diagram illustrating tiles and LCUs in a picture 301.

When encoding and decoding are independently performed on each domain that is generated by splitting the picture 301 in at least one direction from among a vertical direction and a horizontal direction, each domain may be referred to as a tile. In order to perform processing in real time by using a large amount of data of a high-definition (HD) or a ultra high-definition (UHD) video, tiles may be formed by splitting pictures into at least one column and at least row and encoding/decoding may be performed according to tiles.

Since each tile in the picture 301 is a spatial domain where encoding/decoding is individually performed, only a tile desired to be encoded/decoded may be selectively encoded/decoded.

In FIG. 3, the picture 301 may be split into tiles by column borders 321 and 323 and row borders 311 and 313. A domain surrounded by one of the column borders 321 and 323 and one of the row borders 311 and 313 is a tile.

When the picture 301 is split into tiles and is encoded, information about positions of the column borders 321 and 323 and the row borders 311 and 313 may be contained in and may be transmitted through an SPS or a PPS. When the picture 301 is decoded, information about the positions of the column borders 321 and 323 and the row borders 311 and 313 may be parsed from the SPS or the PPS, decoding may be performed on tiles and subdomains of the picture 301 may be restored, and the subdomains may be restored to one picture 301 by using the information about the column borders 321 and 323 and the row borders 311 and 313.

The picture 301 is split into LCUs and encoding/decoding is performed on blocks. Accordingly, each tile that is formed by splitting the picture 301 by using the column borders 321 and 323 and the row borders 311 and 313 may include LCUs. Since the column borders 321 and 323 and the row borders 311 and 313 that split the picture 301 pass through borders between adjacent LCUs, each LCU is not split. Accordingly, each tile may include M (M is an integer) LCUs.

Accordingly, as processing is performed on tiles of the picture 301, encoding/decoding may be performed on LCUs in each tile. A number in each LCU in FIG. 3 denotes a scan order of LCUs in a tile, that is, an order in which processing is performed for encoding or decoding.

A tile may be different from a slice segment and a slice in that encoding/decoding is independently performed between tiles. A slice segment and a slice will now be explained in detail with reference to FIG. 4.

Figure 4:
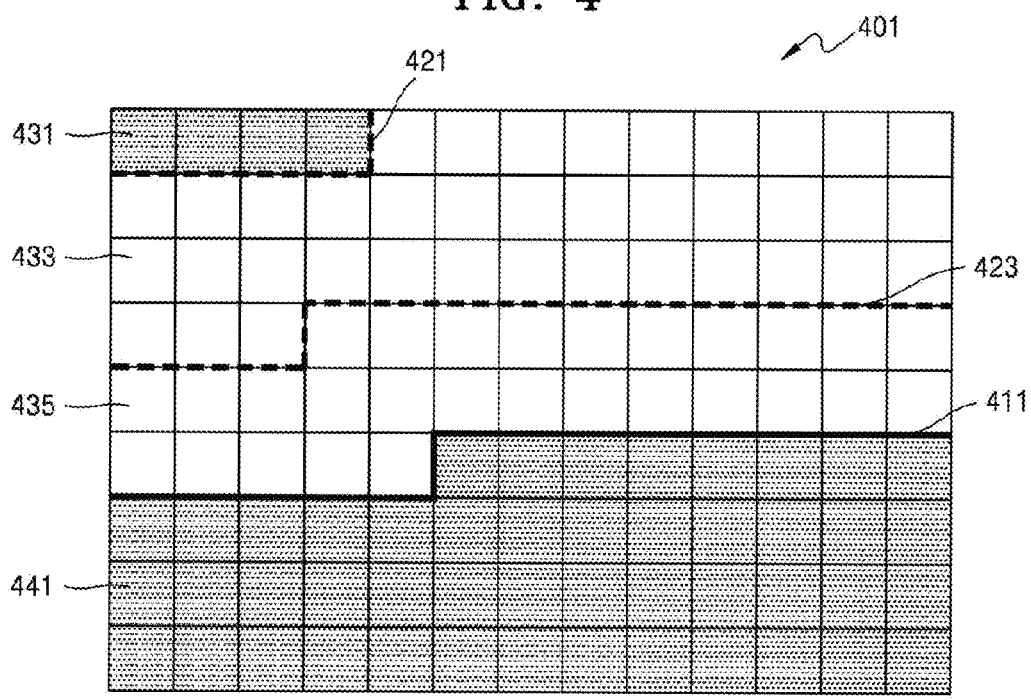
FIG. 4 is a diagram illustrating a slice segment and LCUs in a picture.

FIG. 4 is a diagram illustrating a slice segment and LCUs in a picture 401.

The picture 401 is split into a plurality of LCUs. In FIG. 4, the picture 401 is split into 13 LCUs in a horizontal direction and 9 LCUs in a vertical direction, that is, 117 LCUs in total. Each LCU may be split into coding units having a tree structure and may be encoded/decoded.

The picture 401 is split into an upper slice and a lower slice, that is, two slices, by a border line 411. The picture 401 is split into slice segments 431, 433, 435, and 441 by border lines 421, 423, and 411.

The slice segments 431, 433, 435, and 441 may be classified into dependent slice segments and independent slice segments. In a dependent slice segment, information that is used or generated in source encoding and entropy encoding for a predetermined slice segment may be referred to for source encoding and entropy encoding of another slice segment. Likewise, during decoding, information that is used or restored in source decoding and parsed information in entropy encoding for a predetermined slice segment from among dependent slice segments may be referred to for entropy decoding and source decoding of another slice segment.

In an independent slice segment, information that is used or generated in source encoding and entropy encoding performed on slice segments is not referred to at all and is independently encoded. Likewise, during decoding, for entropy decoding and source decoding of an independent slice segment, parsed information and restoration information of another slice segment is not used at all.

Information about whether a slice segment is a dependent slice segment or an independent slice segment may be contained and may be transmitted through a slice segment header. When the picture 301 is to be decoded, information about a slice segment type may be parsed from the slice segment header, and it may be determined whether a current slice segment is independently decoded from another slice segment or is restored by referring to the slice segment according to the slice segment type.

In particular, a value of syntax elements of a slice segment header of an independent slice segment, that is, header information, may not be determined by being inferred from header information of a preceding slice segment. In contrast, header information of a slice segment header of a dependent slice segment may be determined by being inferred from header information of a preceding slice segment.

Each slice may include N (N is an integer) LCUs. One slice may include at least one slice segment. When one slice includes only one slice segment, the slice may include an independent slice segment. One slice may include one independent slice segment and at least one dependent slice segment that are subsequent to the independent slice segment. At least one slice segment that is included in one slice may be transmitted/received through the same access unit.

The upper slice of the picture 410 includes the slice segment 421 that is one independent slice segment and the slice segments 433 and 435 that are two dependent slice segments. The lower slice of the picture 410 includes only the slice segment 441 that is an independent slice segment.

A process of parsing a symbol through entropy decoding will now be explained in detail with reference to FIGS. 5 through 7.

Figure 5:
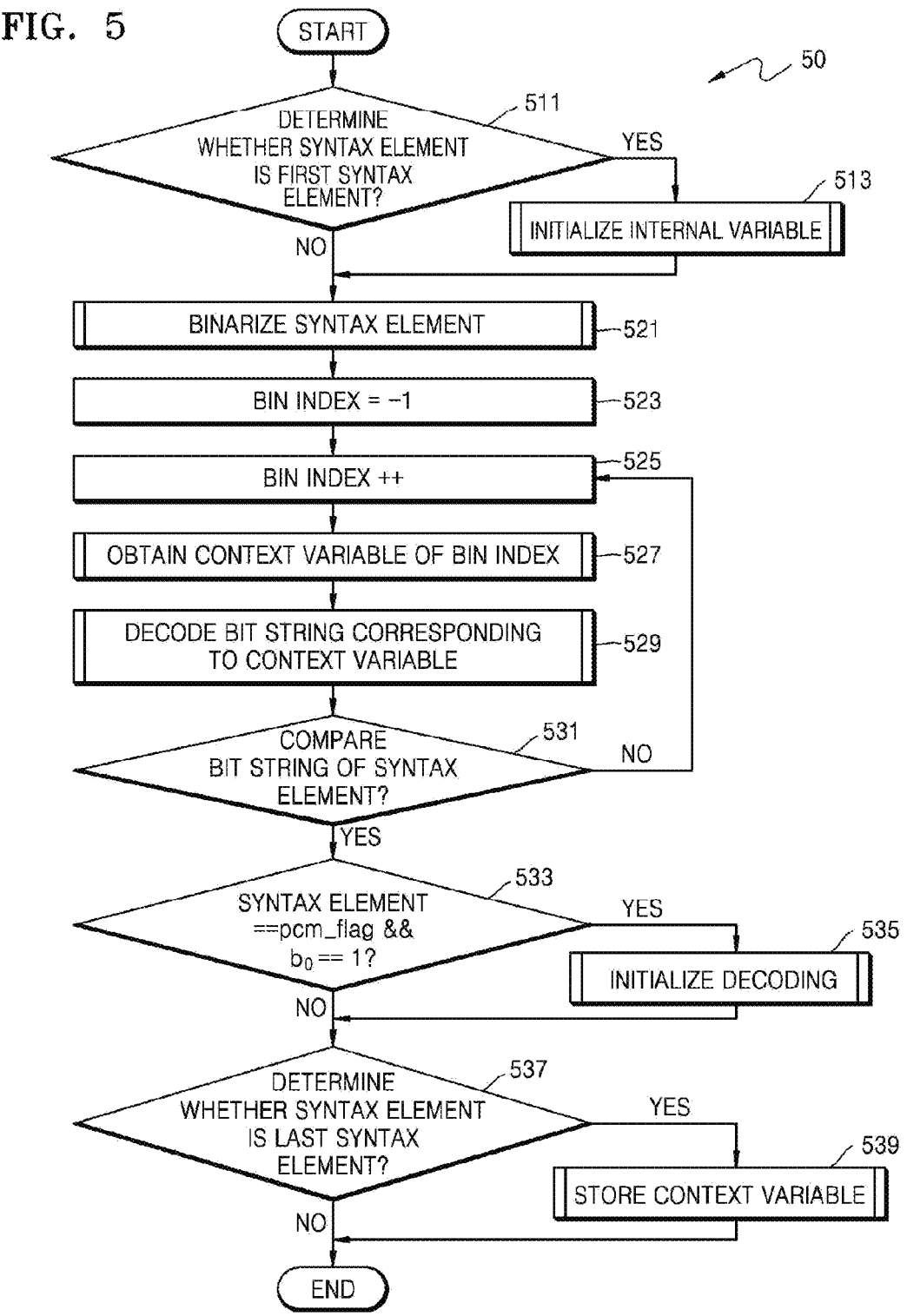
FIG. 5 is a flowchart of a context adaptive binary arithmetic coding (CABAC) parsing operation according to an exemplary embodiment.

FIG. 5 is a flowchart of a CABAC parsing operation 50 according to an exemplary embodiment.

When the video entropy decoding apparatus 20 performs CABAC decoding according to an exemplary embodiment, a symbol for a predetermined syntax element may be parsed through the CABAC parsing operation 50.

In operation 511, the video entropy decoding apparatus 20 determines whether a syntax element to be currently parsed is a first syntax element in a subset such as a column of slice segments, tiles, or LCUs, that is, a syntax element that is first parsed.

When it is determined in operation 511 that the syntax element to be currently parsed is a first syntax element, the CABAC parsing operation 50 proceeds to operation 513. In operation 513, a context internal variable is initialized. The context internal variable may be a context index and a context table for a current syntax element. The context internal variable may be determined to be a preset default value.

In operation 521, the video entropy decoding apparatus 20 may obtain a bin string indicating the current syntax element from a bitstream. In operations 523 and 525, a first bin index of the bin string may be set to −1, and a bin index may increase by 1 whenever one bit is added to the bin string.

In operation 527, the video entropy decoding apparatus 20 may obtain a context variable corresponding to a current bin index of the syntax element. For example, the context variable corresponding to the current bin index may include a context table, a context index, and a bypass flag. Preset data about a context variable may be previously stored in the video entropy decoding apparatus 20 to correspond to each bin index of each syntax element. A context variable corresponding to a bin index of the current syntax element may be selected based on the previously stored data.

In operation 529, the video entropy decoding apparatus 20 may decode a bit string corresponding to the context variable of the bin string. A bypass state that is assigned to the current bin index may be determined based on data about a bypass flag that is preset according to each bin index according to syntax elements. A context index may be determined based on an attribute (e.g., a scan index of a data unit, a color component index, or a size of a data unit) or a current state of a data unit (e.g., a coding unit, a transformation unit, or a prediction unit) that is currently encoded according to each syntax element. A bit string corresponding to a current context index and a bypass state may be determined in a context table.

In operation 531, the video entropy decoding apparatus 20 may compare data that contains a bit string that is available in the current syntax element with a current bit string that is determined in operation 529. When the current bit string does not belong to bit string data, the CABAC parsing operation 50 may return to operation 525 to increase the bin index by 1 and operations 527 and 529 to determine a context variable for a bin string obtained by adding one bit and decode a bit string.

When it is determined in operation 531 that the current bit string that is determined in operation 529 belongs to bit string data for the syntax element, the CABAC parsing operation 50 proceeds to operation 533. In operation 533, it may be determined whether the current syntax element is information 'pcm_flag' indicating a PCM mode and a syntax element value indicates the PCM mode. When it is determined in operation 529 that a unit is an LCU in the PCM mode, the CABAC parsing operation 50 proceeds to operation 535. In operation 535, the CABAC parsing operation 50 may be initialized.

When it is determined in operation 533 that a mode is not the PCM mode, the CABAC parsing operation 50 proceeds to operation 537. In operation 537, it may be determined whether the current syntax element is a last syntax element in a current subset (e.g., an LCU or a slice segment), that is, is an object to be last parsed. When it is determined in operation 537 that the current syntax element is a last syntax element, the CABAC parsing operation 50 proceeds to operation 539. In operation 539, a context variable that is finally updated in a current LCU may be stored.

When the storing of the context variable is completed or the current syntax element is not a last syntax element, a process of parsing the current syntax element may end.

Figure 6A:
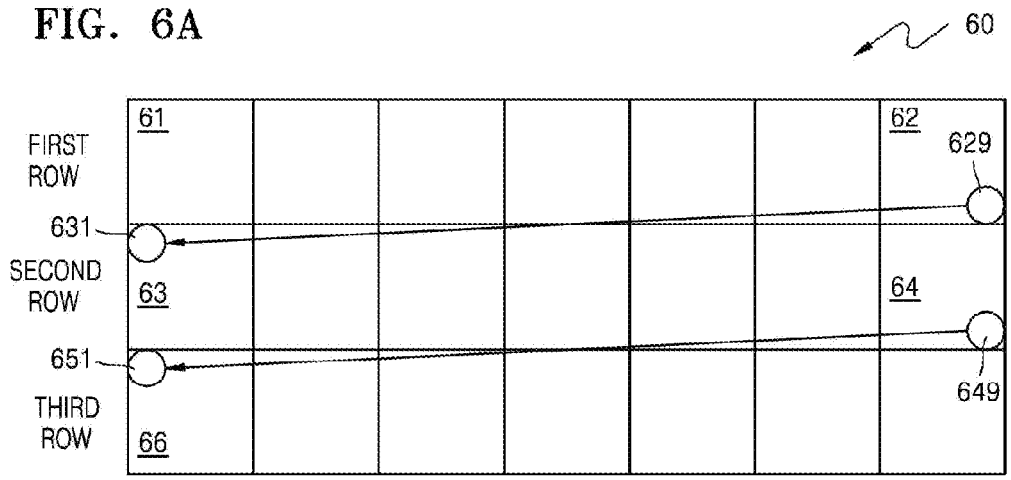
FIG. 6A is a diagram for explaining entropy decoding using a stored context variable.

The context variable that is stored in operation 539 may be used for entropy decoding of another subset. FIG. 6A is a diagram for explaining entropy decoding using a stored context variable.

When a subset is each LCU row, an initial context variable of a current LCU row may be determined by using a final context variable of a previous LCU row.

For example, an initial context variable of a first LCU of a current LCU row in an image 60 may be determined to be, that is, may be synchronized with, a final context variable of a last LCU of an LCU row that is located right over the current LCU row. Accordingly, while an initial context variable of a first LCU 61 of a first LCU row may be set to a default context variable, an initial context variable 631 of a first LCU 63 of a second LCU row may be determined to be a final context variable 629 of a last LCU 62 of the first LCU row, and an initial context variable 651 of a first LCU 66 of a third LCU row may be determined to be a final context variable 649 of a last LCU 64 of the second LCU row.

If a synchronization distance is 1, for synchronization of a context variable of a current LCU, the context storage unit 26 may use a context variable of a second LCU of an upper LCU row. Accordingly, when updating of the second LCU of the upper LCU row is completed and a final context variable is determined, the final context variable may be stored, and a context variable of an LCU of a current LCU row may be determined by using the stored final context variable of the upper LCU row.

Figure 6B:
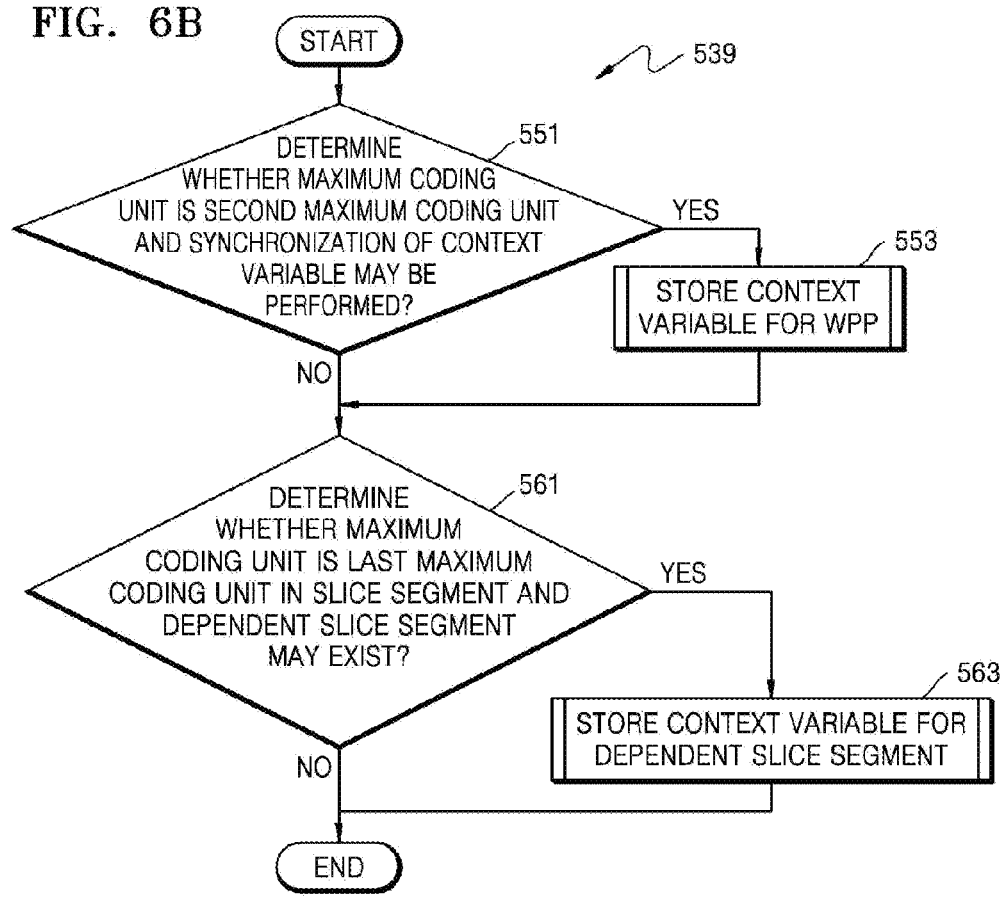
FIG. 6B is a detailed flowchart of an operation of storing a context variable in the CABAC parsing operation according to an exemplary embodiment.

FIG. 6B is a detailed flowchart of operation 539 of storing a context variable in the CABAC parsing operation 50 according to an exemplary embodiment.

In operation 551, the context storage unit 16 or 26 may determine whether a current LCU is a second LCU in a current subset and synchronization of a context variable has to be performed in a current picture. When it is determined in operation 551 that synchronization of the context variable is needed and the current LCU is a second LCU, operation 539 proceeds to operation 553. In operation 553, the context storage unit 16 or 26 may store a final context variable of the current LCU for wavefront parallel processing (WPP). In WPP, when a synchronization distance is 1 as shown in FIG. 6A, a context variable of a first LCU of a current LCU row may be synchronized with a context variable that is stored in a second LCU of an upper LCU row.

In operation 561, the context storage unit 16 or 26 may determine whether the current LCU is a last LCU in a current slice segment and a dependent slice segment may exist in the current picture. When it is determined in operation 561 that the dependent slice segment may exist and the current slice segment is a last slice segment, operation 539 may proceed to operation 563. In operation 563, the context storage unit 16 or 26 may store a final context variable of the current LCU for the dependent slice segment that is subsequent.

FIG. 7 is a diagram illustrating a syntax of a slice segment header 71 according to an exemplary embodiment.

The video entropy decoding apparatus 20 may obtain information about entry point offsets of a current slice segment from the slice segment header 71. In detail, in information 72, when a slice segment in a picture in which the current slice segment is included satisfies at least one condition from among a condition for a possibility 'tiles_enabled_flag' that a tile exists and a condition for a possibility 'entropy_coding_sync_enabled_flag' that a context variable is synchronized according to LCUs, the slice segment header 71 may contain information 73 'num_entry_point_offsets' indicating a number of entry points of subsets that are included in the current slice segment. Information 'entry_point_offset_minus1[i]' 75 indicating a number that is less by 1 than an offset according to each actual entry point for each entry point 74 may be assigned according to the entry points.

When two or more subsets exist, since a subset offset has to be greater than 0, entry point offset information 'entry_point_offset_minus1[i]' may be obtained by subtracting 1 from an actual subset offset. Accordingly, the actual subset offset may be a value that is greater by 1 than a number indicated by the entry point offset information 'entry_point_offset_minus1[i]'.

A first byte of a current subset may be determined by summing subset offsets from a previous subset to a current subset by using the entry point offset information 'entry_point_offset_minus1[i]' that is assigned to each subset. Accordingly, a value obtained after summing values that are greater by 1 than a number indicated by the entry point offset information 'entry_point_offset_minus1[i]' of subsets from the previous subset to the current subset may be determined as a first byte of the current subset.

An index of bytes that constitute each subset starts with 0, and a byte index indicating a first byte is 0. Accordingly, a last byte of the current subset may be determined by summing the first byte of the current subset with a number indicated by the entry point offset information 'entry_point_offset_minus1[i]' that is assigned to the current subset.

In the video entropy encoding apparatus 10 according to an exemplary embodiment and the video entropy decoding apparatus 20 according to an exemplary embodiment, blocks into which video data is split are LCUs and each of the LCUs is split into coding units having a tree structure as described above. A video encoding method and apparatus and a vide decoding method and apparatus based on an LCU and coding units having a tree structure according to an exemplary embodiment will now be explained with reference to FIGS. 8 through 20.

Figure 8:
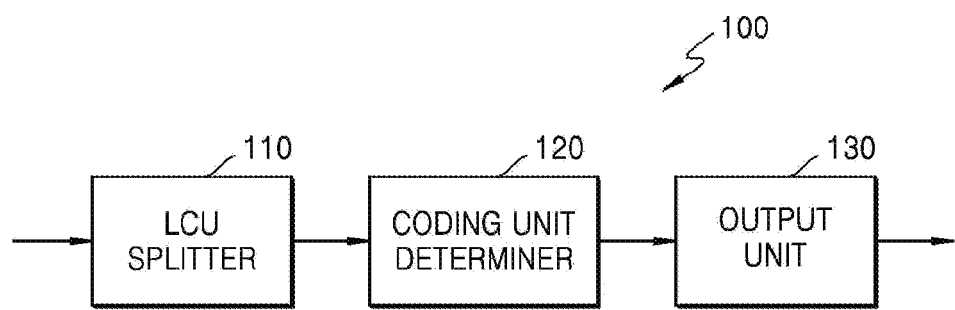
FIG. 8 is a block diagram of a video encoding apparatus based on coding units having a tree structure according to an exemplary embodiment.

FIG. 8 is a block diagram of a video encoding apparatus 100 based on coding units having a tree structure according to an exemplary embodiment.

The video encoding apparatus 100 involving video prediction based on coding units having a tree structure includes a maximum coding unit (LCU) splitter 110, a coding unit determiner 120, and an output unit 130 (e.g., an output, etc.). Hereinafter, the video encoding apparatus 100 involving video prediction based on coding units having a tree structure according to an exemplary embodiment is referred to as a 'video encoding apparatus 100' for convenience of explanation.

The coding unit LCU splitter 110 may split a current picture based on an LCU that is a coding unit having a maximum size for the current picture of an image. If the current picture is larger than the LCU, image data of the current picture may be split into the at least one LCU. The LCU according to an exemplary embodiment may be a data unit having a size of 32×32, 64×64, 128×128, 256×256, etc., wherein a shape of the data unit is a square having a width and length in squares of 2.

A coding unit according to an exemplary embodiment may be characterized by a maximum size and a depth. The depth denotes the number of times the coding unit is spatially split from the LCU, and as the depth increases, deeper coding units according to depths may be split from the LCU to a minimum coding unit. A depth of the LCU is an uppermost depth and a depth of the minimum coding unit is a lowermost depth. Since a size of a coding unit corresponding to each depth decreases as the depth of the LCU increases, a coding unit corresponding to an upper depth may include a plurality of coding units corresponding to lower depths.

As described above, the image data of the current picture is split into the LCUs according to a maximum size of the coding unit, and each of the LCUs may include deeper coding units that are split according to depths. Since the LCU according to an exemplary embodiment is split according to depths, the image data of a spatial domain included in the LCU may be hierarchically classified according to depths.

A maximum depth and a maximum size of a coding unit, which limit the total number of times a height and a width of the LCU are hierarchically split, may be preset.

The coding unit determiner 120 encodes at least one split region obtained by splitting a region of the LCU according to depths, and determines a depth to output a finally encoded image data according to the at least one split region. In other words, the coding unit determiner 120 determines a coded depth by encoding the image data in the deeper coding units according to depths, according to the LCU of the current picture, and selecting a depth having the least encoding error. The determined coded depth and the encoded image data according to the determined coded depth are output to the output unit 130.

The image data in the LCU is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each LCU.

The size of the LCU is split as a coding unit is hierarchically split according to depths, and the number of coding units increases. Even if coding units correspond to the same depth in one LCU, it is determined whether to split each of the coding units corresponding to the same depth to a lower depth by measuring an encoding error of the image data of the each coding unit, separately. Accordingly, even when image data is included in one LCU, the encoding errors may differ according to regions in the one LCU, and thus the coded depths may differ according to regions in the image data. Thus, one or more coded depths may be determined in one LCU, and the image data of the LCU may be split according to coding units of at least one coded depth.

Accordingly, the coding unit determiner 120 may determine coding units having a tree structure included in the LCU. The 'coding units having a tree structure' according to an exemplary embodiment include coding units corresponding to a depth determined to be the coded depth, from among all deeper coding units included in the LCU. A coding unit of a coded depth may be hierarchically determined according to depths in the same region of the LCU, and may be independently determined in different regions. Similarly, a coded depth in a current region may be independently determined from a coded depth in another region.

A maximum depth according to an exemplary embodiment is an index related to the number of splitting times from an LCU to a minimum coding unit. A first maximum depth according to an exemplary embodiment may denote the total number of splitting times from the LCU to the minimum coding unit. A second maximum depth according to an exemplary embodiment may denote the total number of depth levels from the LCU to the minimum coding unit. For example, when a depth of the LCU is 0, a depth of a coding unit, in which the LCU is split once, may be set to 1, and a depth of a coding unit, in which the LCU is split twice, may be set to 2. Here, if the minimum coding unit is a coding unit in which the LCU is split four times, 5 depth levels of depths 0, 1, 2, 3, and 4 exist, and thus the first maximum depth may be set to 4, and the second maximum depth may be set to 5.

Prediction encoding and transformation may be performed on the LCU. The prediction encoding and the transformation are also performed based on the deeper coding units according to a depth equal to or depths less than the maximum depth, according to the LCU.

Since the number of deeper coding units increases whenever the LCU is split according to depths, encoding, including the prediction encoding and the transformation, has to be performed on all of the deeper coding units generated as the depth increases. For convenience of explanation, the prediction encoding and the transformation will now be described based on a coding unit of a current depth, in at least one LCU.

The video encoding apparatus 100 according to an exemplary embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the LCU, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split, the coding unit may become a prediction unit of 2N×2N and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. The skip mode may be performed only on the partition of 2N×2N. The encoding is independently performed on one prediction unit in a coding unit, thereby selecting a prediction mode having a least encoding error.

The video encoding apparatus 100 according to an exemplary embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in the similar manner as the coding unit according to the tree structure. Thus, residual data in the coding unit may be split according to the transformation unit according to the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit according to the tree structure may be set according to the transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units having a tree structure in an LCU and methods of determining a prediction unit/partition, and a transformation unit, according to an exemplary embodiment, will be described in detail below with reference to FIGS. 10 through 20.

The coding unit determiner 120 may measure an encoding error of deeper coding units according to depths by using Rate-Distortion Optimization based on Lagrangian multipliers.

The output unit 130 outputs the image data of the LCU, which is encoded based on the at least one coded depth determined by the coding unit determiner 120, and information about the coding mode according to the coded depth, in bitstreams.

The encoded image data may be obtained by encoding residual data of an image.

The information about the coding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one LCU, and information about at least one coding mode is determined for a coding unit of a coded depth, information about at least one coding mode may be determined for one LCU. A coded depth of the image data of the LCU may be different according to locations since the image data is hierarchically split according to depths, and thus information about the coded depth and the coding mode may be set for the image data.

Accordingly, the output unit 130 may assign encoding information about a corresponding coded depth and a coding mode to at least one of the coding unit, the prediction unit, and a minimum unit included in the LCU.

The minimum unit according to an exemplary embodiment is a square data unit obtained by splitting the minimum coding unit constituting the lowermost depth by 4. Alternatively, the minimum unit according to an exemplary embodiment may be a maximum square data unit that may be included in all of the coding units, prediction units, partition units, and transformation units included in the LCU.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, an SPS, or a PPS.

Information about a maximum size of the transformation unit permitted with respect to a current video, and information about a minimum size of the transformation unit may also be output through a header of a bitstream, an SPS, or a PPS. The output unit 130 may encode and output reference information related to prediction, prediction information, and slice type information.

In the video encoding apparatus 100 according to a simplest exemplary embodiment, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. The coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each LCU, based on the size of the LCU and the maximum depth determined considering characteristics of the current picture. Since encoding may be performed on each LCU by using any one of various prediction modes and transformations, an optimum coding mode may be determined considering characteristics of the coding unit of various image sizes.

Thus, if an image having a high resolution or a large data amount is encoded in a macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100 according to an exemplary embodiment, image compression efficiency may be increased since a coding unit is adjusted while considering characteristics of an image while increasing a maximum size of a coding unit while considering a size of the image.

The video encoding apparatus 100 according to an exemplary embodiment determines coding units of a tree structure for every LCU, and generates symbols as a result of encoding performed for every encoding unit. The video entropy encoding apparatus 10 according to an exemplary embodiment may perform entropy encoding on symbols for every LCU. In particular, the video entropy encoding apparatus 10 may perform entropy encoding on each LCU according to a row of LCUs including LCUs that are serially arranged in a horizontal direction, for every tile or slice segment generated by splitting a picture. The video entropy encoding apparatus 10 may simultaneously perform parallel entropy encoding on two or more rows of LCUs.

The video entropy encoding apparatus 10 may generate a bit string of symbols by performing binarization on symbols that are determined by performing encoding on LCUs. A context variable of each bin index of a syntax element value corresponding to a symbol of an LCU may be determined, and a bin string indicating the syntax element value may be determined based on the context variable of a syntax element. The video entropy encoding apparatus 10 may adopt a bin string indicated by a current context variable that is determined in a context table for a current syntax element value.

After forming the bin string for all of syntax elements for the LCU, the video entropy encoding apparatus 10 may determine whether to store context variables that are determined in the LCU. When the syntax element is a last syntax element in the LCU, a dependent slice segment may be included in a picture in which the LCU is included, and the LCU is a last LCU in a slice segment, the context variables for the LCU may be stored.

The context storage unit 16 may store context variables for an LCU when a dependent slice segment may be included in a picture, irrespective of whether a slice segment is an independent slice segment or a dependent slice segment.

When a plurality of slice segments are included in a picture, for entropy encoding for a context variable of a first LCU of a dependent slice segment that is located next to a current slice segment, a context variable that is stored in the current slice segment may be used.

Figure 9:
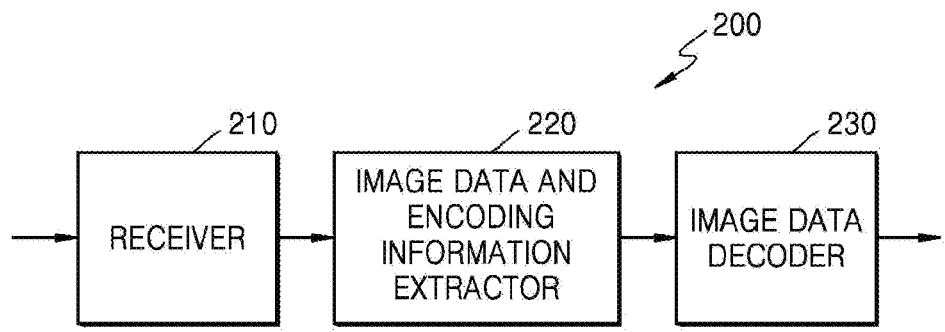
FIG. 9 is a block diagram of a video decoding apparatus based on coding units having a tree structure according to an exemplary embodiment.

FIG. 9 is a block diagram of a video decoding apparatus 200 based on coding units having a tree structure according to an exemplary embodiment.

The video decoding apparatus 200 that involves video prediction based on coding units having a tree structure according to an exemplary embodiment includes a receiver 210, an image data and encoding information extractor 220, and an image data decoder 230. Hereinafter, the video decoding apparatus 200 involving video prediction based on coding units having a tree structure according to an exemplary embodiment is referred to as a 'video decoding apparatus 200' for convenience of explanation.

Definitions of various terms, such as a coding unit, a depth, a prediction unit, a transformation unit, and information about various coding modes, for decoding operations of the video decoding apparatus 200 are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each LCU, and outputs the extracted image data to the image data decoder 230. The image data and encoding information extractor 220 may extract information about a maximum size of a coding unit of a current picture, from a header about the current picture, an SPS, or a PPS.

The image data and encoding information extractor 220 extracts information about a coded depth and a coding mode for the coding units having a tree structure according to each LCU, from the parsed bitstream. The extracted information about the coded depth and the coding mode is output to the image data decoder 230. In other words, the image data in a bit string is split into the LCU so that the image data decoder 230 decodes the image data for each LCU.

The information about the coded depth and the coding mode according to the LCU may be set for information about at least one coding unit corresponding to the coded depth, and information about a coding mode may include information about a partition type of a corresponding coding unit corresponding to the coded depth, about a prediction mode, and a size of a transformation unit. Splitting information according to depths may be extracted as the information about the coded depth.

The information about the coded depth and the coding mode according to each LCU extracted by the image data and encoding information extractor 220 is information about a coded depth and a coding mode determined to generate a minimum encoding error when an encoder, such as the video encoding apparatus 100, repeatedly performs encoding for each deeper coding unit according to depths according to each LCU. Accordingly, the video decoding apparatus 200 may restore an image by decoding the image data according to a coded depth and a coding mode that generates the minimum encoding error.

Since encoding information about the coded depth and the coding mode may be assigned to a predetermined data unit from among a corresponding coding unit, a prediction unit, and a minimum unit, the image data and encoding information extractor 220 may extract the information about the coded depth and the coding mode according to the predetermined data units. If information about a coded depth and coding mode of a corresponding LCU is recorded according to predetermined data units, the predetermined data units to which the same information about the coded depth and the coding mode is assigned may be inferred to be the data units included in the same LCU.

The image data decoder 230 restores the current picture by decoding the image data in each LCU based on the information about the coded depth and the coding mode according to the LCUs. In other words, the image data decoder 230 may decode the encoded image data based on the extracted information about the partition type, the prediction mode, and the transformation unit for each coding unit from among the coding units having the tree structure included in each LCU. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read information about a transformation unit according to a tree structure for each coding unit so as to perform inverse transformation based on transformation units for each coding unit, for inverse transformation for each LCU. Through the inverse transformation, a pixel value of a spatial domain of the coding unit may be restored.

The image data decoder 230 may determine a coded depth of a current LCU by using split information according to depths. If the split information indicates that image data is no longer split in the current depth, the current depth is a coded depth. Accordingly, the image data decoder 230 may decode encoded data in the current LCU by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same coding mode. As such, the current coding unit may be decoded by obtaining the information about the coding mode for each coding unit.

The receiver 210 may include the video entropy decoding apparatus 20 of FIG. 2A. The video entropy decoding apparatus 20 may parse a plurality of rows of LCUs from a received bitstream.

When the receiver 22 extracts a first row of LCUs and a second row of LCUs from the bitstream, the first entropy decoder 24 may sequentially restore symbols of LCUs of the first row of LCUs by performing entropy decoding on the first row of LCUs.

The video entropy decoding apparatus 20 may determine a bin string and a bin index for an LCU that is obtained from the bitstream. The video entropy decoding apparatus 20 may store data about a context table containing a correlation between a bin string and a context variable for each syntax element. The video entropy decoding apparatus 20 may determine a value of a syntax element indicated by a current bin string by comparing bin strings that may be assigned to the syntax element in a current context variable based on the context table with the bin string in the bin index that is currently determined.

When the syntax element is a last syntax element in the LCU, A dependent slice segment may be included in a picture in which the LCU is included, and the LCU is a last LCU in a slice segment, the video entropy decoding apparatus 20 may store context variables for the LCU. When a dependent slice segment may be included in a picture irrespective of whether a slice segment is an independent slice segment or the dependent slice segment, context variables for the LCU may be stored.

When a plurality of slice segments are included in a picture, for entropy encoding for a context variable of a first LCU of a dependent slice segment that is located next to a current slice segment, a context variable that is stored in the current slice segment may be used.

The video entropy decoding apparatus 20 may restore symbols of the LCU by using a value of each syntax element.

As a result, the video decoding apparatus 200 may obtain information about a coding unit having a minimum encoding error by recursively performing encoding on each LCU during an encoding process and may use the information to decode a current picture. That is, encoded image data of coding units having a tree structure determined as optimum coding units for each LCU may be decoded.

Accordingly, even when an image has a high resolution or a large data amount, image data may be efficiently decoded and restored according to a coding mode and a size of a coding unit that are adaptively determined according to characteristics of the image by using information about an optimum coding mode that is transmitted from an encoder.

Figure 10:
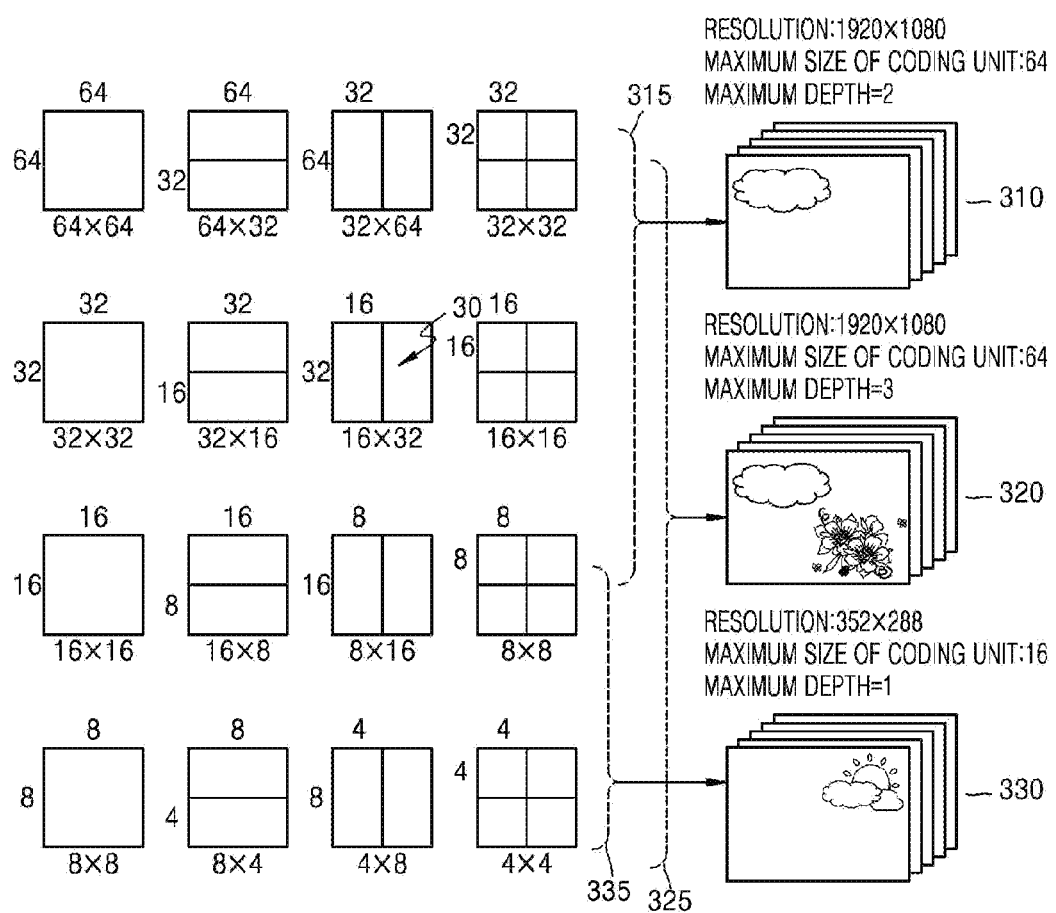
FIG. 10 is a diagram for explaining a concept of coding units according to an exemplary embodiment.

FIG. 10 is a diagram for explaining a concept of coding units according to an exemplary embodiment.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from an LCU to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include an LCU having a long axis size of 64, and coding units having long axis sizes of 32 and 16 since depths are increased to two layers by splitting the LCU twice. Since the maximum depth of the video data 330 is 1, coding units 335 of the video data 330 may include an LCU having a long axis size of 16, and coding units having a long axis size of 8 since depths are increased to one layer by splitting the LCU once.

Since the maximum depth of the video data 320 is 3, coding units 325 of the video data 320 may include an LCU having a long axis size of 64, and coding units having long axis sizes of 32, 16, and 8 since the depths are increased to 3 layers by splitting the LCU three times. As a depth increases, detailed information may be precisely expressed.

Figure 11:
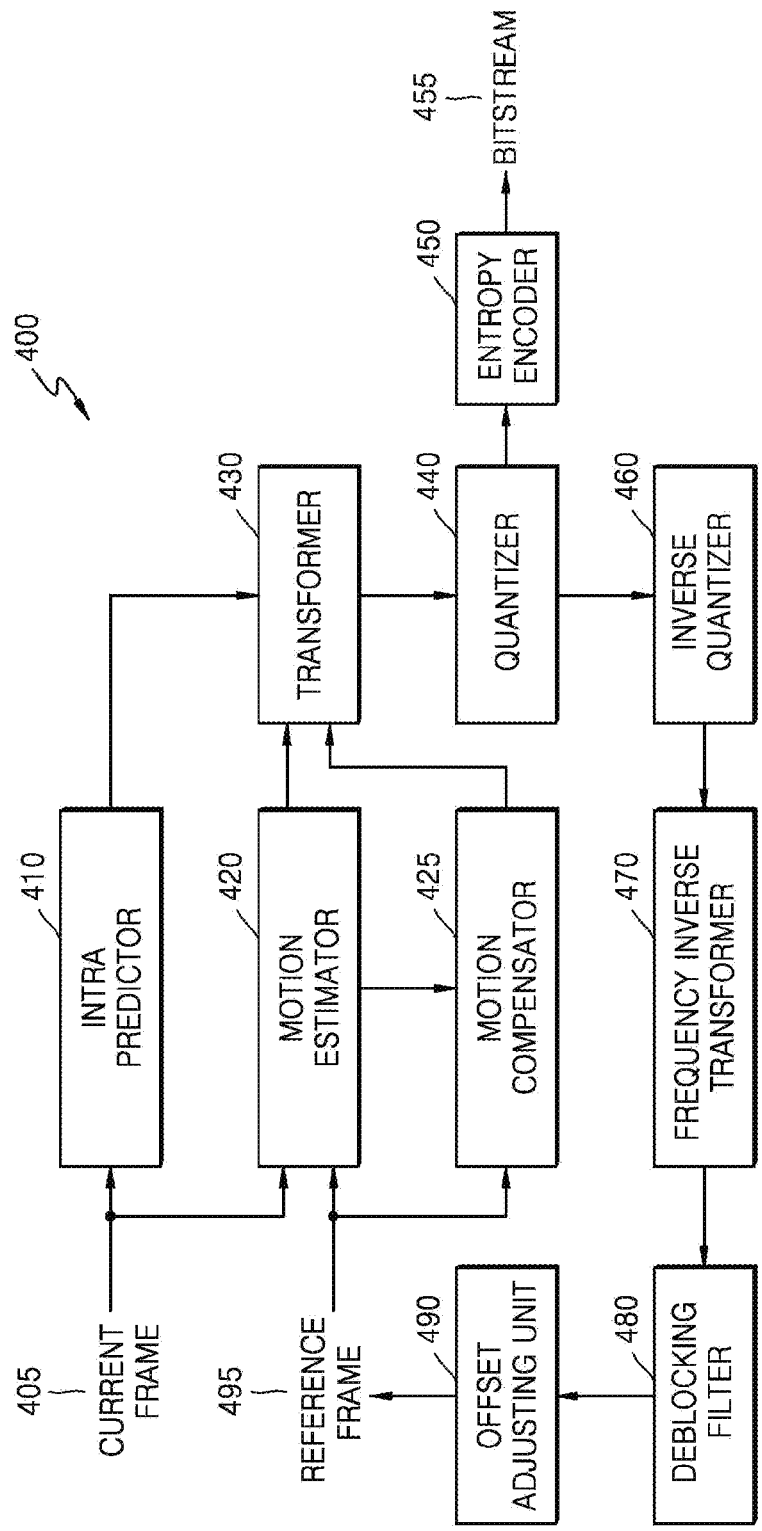
FIG. 11 is a block diagram of an image encoder based on coding units according to an exemplary embodiment.

FIG. 11 is a block diagram of an image encoder 400 based on coding units according to an exemplary embodiment.

The image encoder 400 according to an exemplary embodiment performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 respectively perform inter estimation and motion compensation on coding units in an inter mode from among the current frame 405 by using the current frame 405, and a reference frame 495.

Data output from the intra predictor 410, the motion estimator 420, and the motion compensator 425 is output as a quantized transform coefficient through a transformer 430 and a quantizer 440. The quantized transform coefficient is restored as data in a spatial domain through an inverse quantizer 460 and an inverse transformer 470, and the restored data in the spatial domain is output as the reference frame 495 after being post-processed through a deblocking unit 480 (e.g., a deblocking filter, etc.) and a loop filtering unit 490 (e.g., a loop filter, an offset adjusting unit, an offset adjuster, etc.). The quantized transform coefficient may be output as a bitstream 455 through an entropy encoder 450.

In order for the image encoder 400 to be applied to the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 have to perform operations based on each coding unit among coding units having a tree structure while considering the maximum depth of each LCU.

Specifically, the intra predictor 410, the motion estimator 420, and the motion compensator 425 determine partitions and a prediction mode of each coding unit from among the coding units having a tree structure while considering the maximum size and the maximum depth of a current LCU, and the transformer 430 determines the size of the transformation unit in each coding unit from among the coding units having a tree structure.

In particular, the entropy encoder 450 may correspond to the video entropy encoding apparatus 10 according to an exemplary embodiment.

Figure 12:
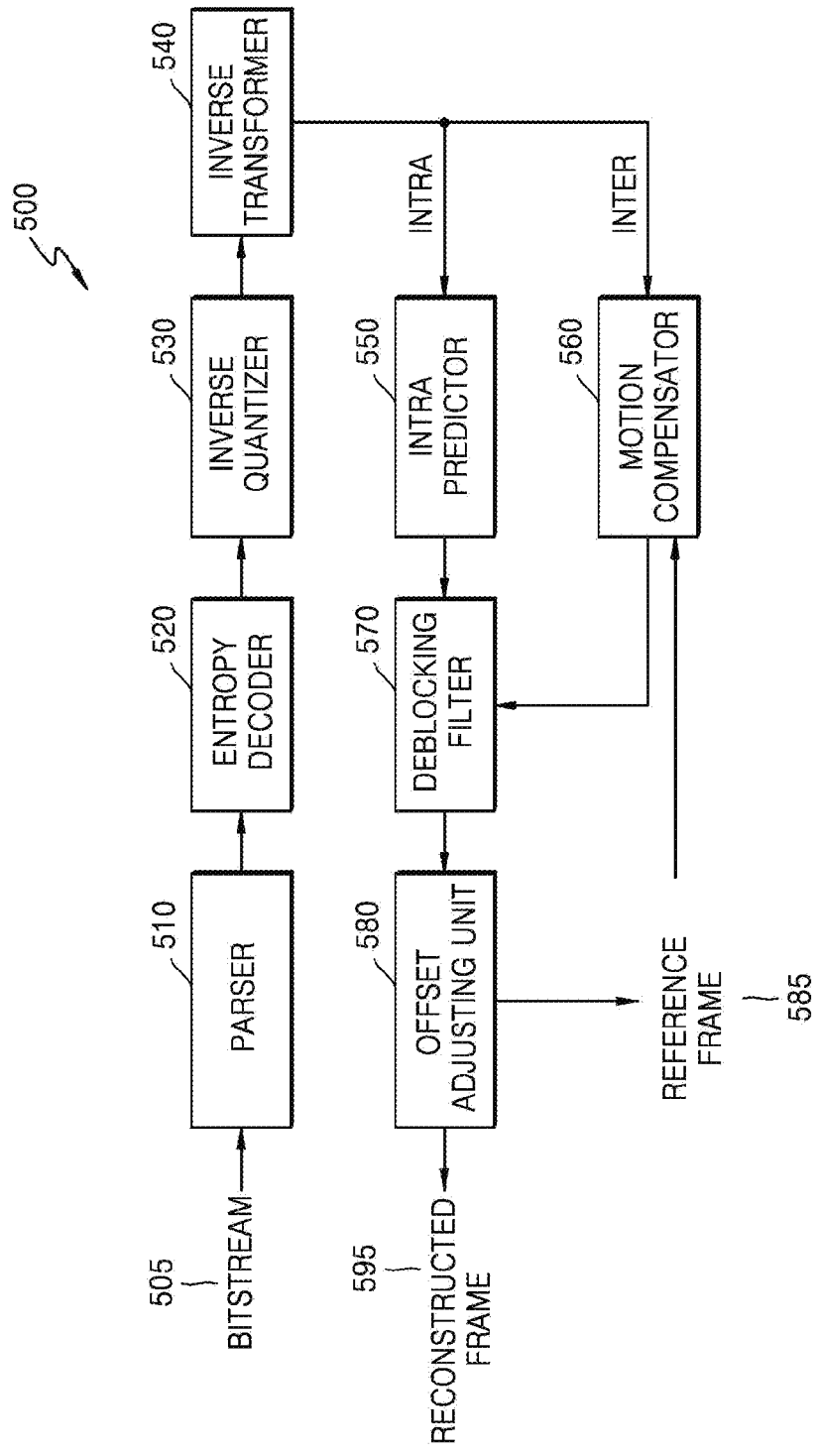
FIG. 12 is a block diagram of an image decoder based on coding units according to an exemplary embodiment.

FIG. 12 is a block diagram of an image decoder 500 based on coding units according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 (e.g., a deblocking filter, etc.) and a loop filtering unit 580 (e.g., an offset adjusting unit, an offset adjuster, a loop filter, etc.). The image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied to the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 have to perform operations based on coding units having a tree structure for each LCU.

Specifically, the intra prediction 550 and the motion compensator 560 determine partitions and a prediction mode for each of the coding units having a tree structure, and the inverse transformer 540 determines a size of a transformation unit for each coding unit. In particular, the entropy decoder 520 may correspond to the video entropy decoding apparatus 20 according to an exemplary embodiment.

Figure 13:
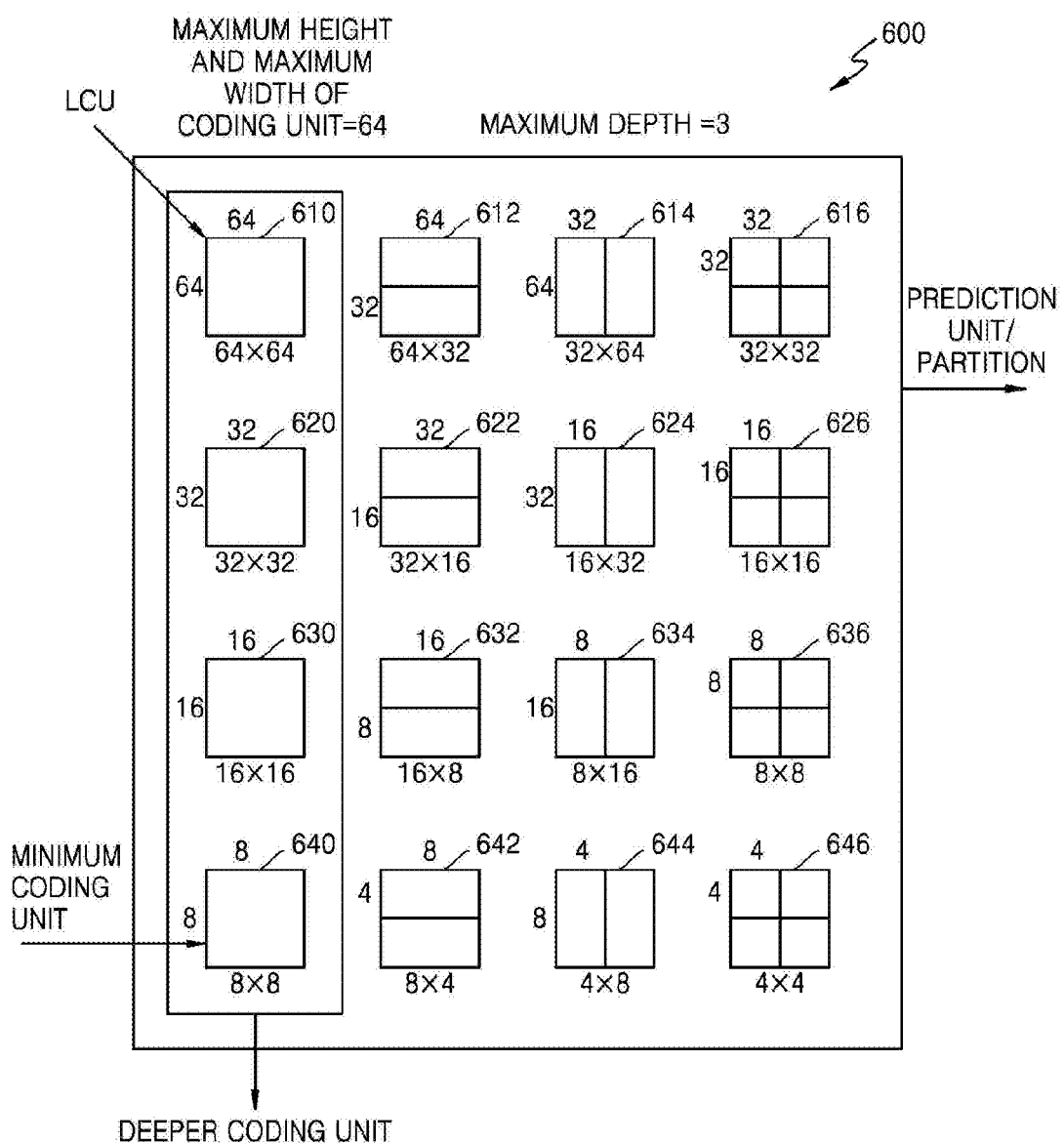
FIG. 13 is a diagram illustrating deeper coding units according to depths and partitions according to an exemplary embodiment.

FIG. 13 is a diagram illustrating deeper coding units according to depths and partitions according to an exemplary embodiment.

The video encoding apparatus 100 according to an exemplary embodiment and the video decoding apparatus 200 according to an exemplary embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units according to an exemplary embodiment, the maximum height and the maximum width of the coding units are each 64, and the maximum depth is 4. In this case, the maximum depth refers to a total number of times the coding unit is split from the LCU to the minimum coding unit. Since a depth increases along a vertical axis of the hierarchical structure 600, a height and a width of the deeper coding unit are each split. A prediction unit and partitions, which are bases for prediction encoding of each deeper coding unit, are shown along a horizontal axis of the hierarchical structure 600.

In other words, a coding unit 610 is an LCU in the hierarchical structure 600, wherein a depth is 0 and a size, i.e., a height by width, is 64×64. The depth increases along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4. The coding unit 640 having a size of 4×4 and a depth of 4 is a minimum coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

Lastly, the coding unit 650 having a depth of 4 and a size of 4×4 that is a minimum coding unit is a coding unit having a lowermost depth, and a corresponding prediction unit may be set to only partitions having a size of 4×4.

In order to determine the at least one coded depth of the coding units constituting the LCU 610, the coding unit determiner 120 of the video encoding apparatus 100 according to an exemplary embodiment has to perform encoding for coding units corresponding to each depth included in the LCU 610.

A number of deeper coding units according to depths including data in the same range and the same size increases as the depth increases. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 have to be each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth increases along the vertical axis of the hierarchical structure 600. A depth and a partition having the minimum encoding error in the coding unit 610 may be selected as the coded depth and a partition type of the coding unit 610.

Figure 14:
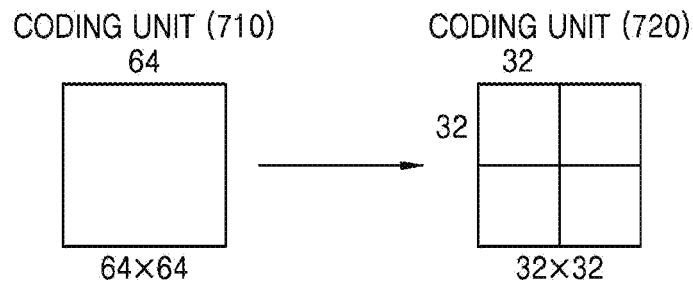
FIG. 14 is a diagram for explaining a relationship between a coding unit and transformation units according to an exemplary embodiment.

FIG. 14 is a diagram for explaining a relationship between a coding unit 710 and transformation units 720 according to an exemplary embodiment.

The video encoding apparatus 100 according to an exemplary embodiment or the video decoding apparatus 200 according to an exemplary embodiment encodes or decodes an image according to coding units having sizes smaller than or equal to an LCU for each LCU. Sizes of transformation units for transformation during encoding may be selected based on data units that are not larger than a corresponding coding unit.

For example, in the video encoding apparatus 100 according to an exemplary embodiment or the video decoding apparatus 200 according to an exemplary embodiment, if a size of the coding unit 710 is 64×64, transformation may be performed by using the transformation units 720 having a size of 32×32.

Data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 15:
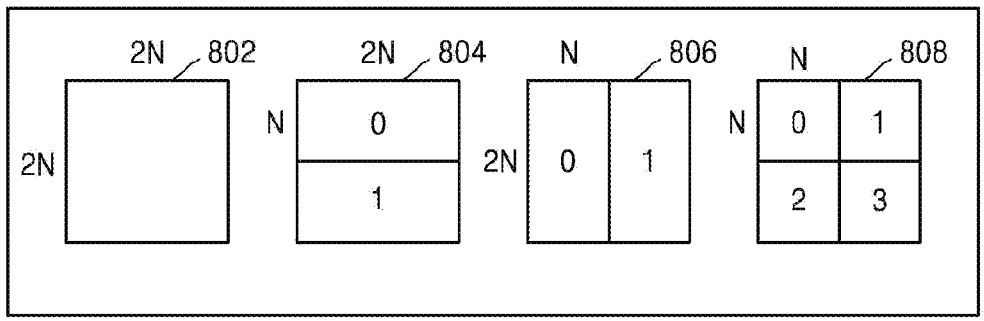
FIG. 15 is a diagram for explaining encoding information of coding units corresponding to a coded depth according to an exemplary embodiment.
Figure 15:
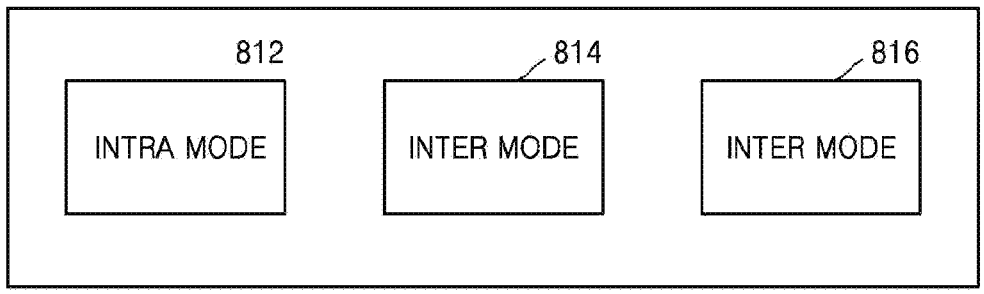
Figure 15:
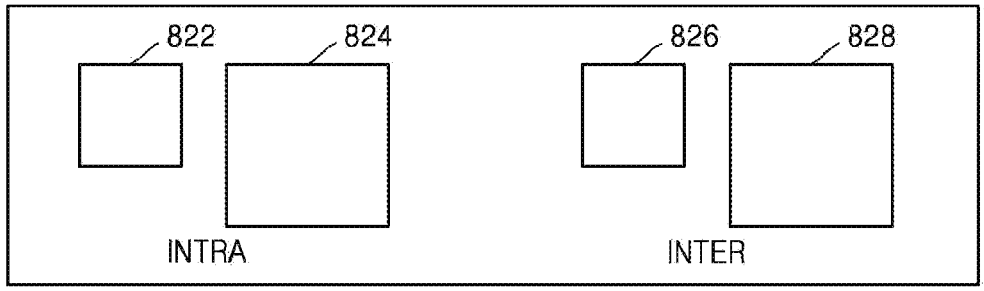

FIG. 15 is a diagram for explaining encoding information of coding units corresponding to a coded depth according to an exemplary embodiment.

The output unit 130 of the video encoding apparatus 100 according to an exemplary embodiment may encode and transmit information 800 about a partition type, information 810 about a prediction mode, and information 820 about a size of a transformation unit for each coding unit corresponding to a coded depth, as information about a coding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 210 of the video decoding apparatus 200 according to an exemplary embodiment may extract and use the information 800, 810, and 820 for decoding, according to each deeper coding unit.

Figure 16:
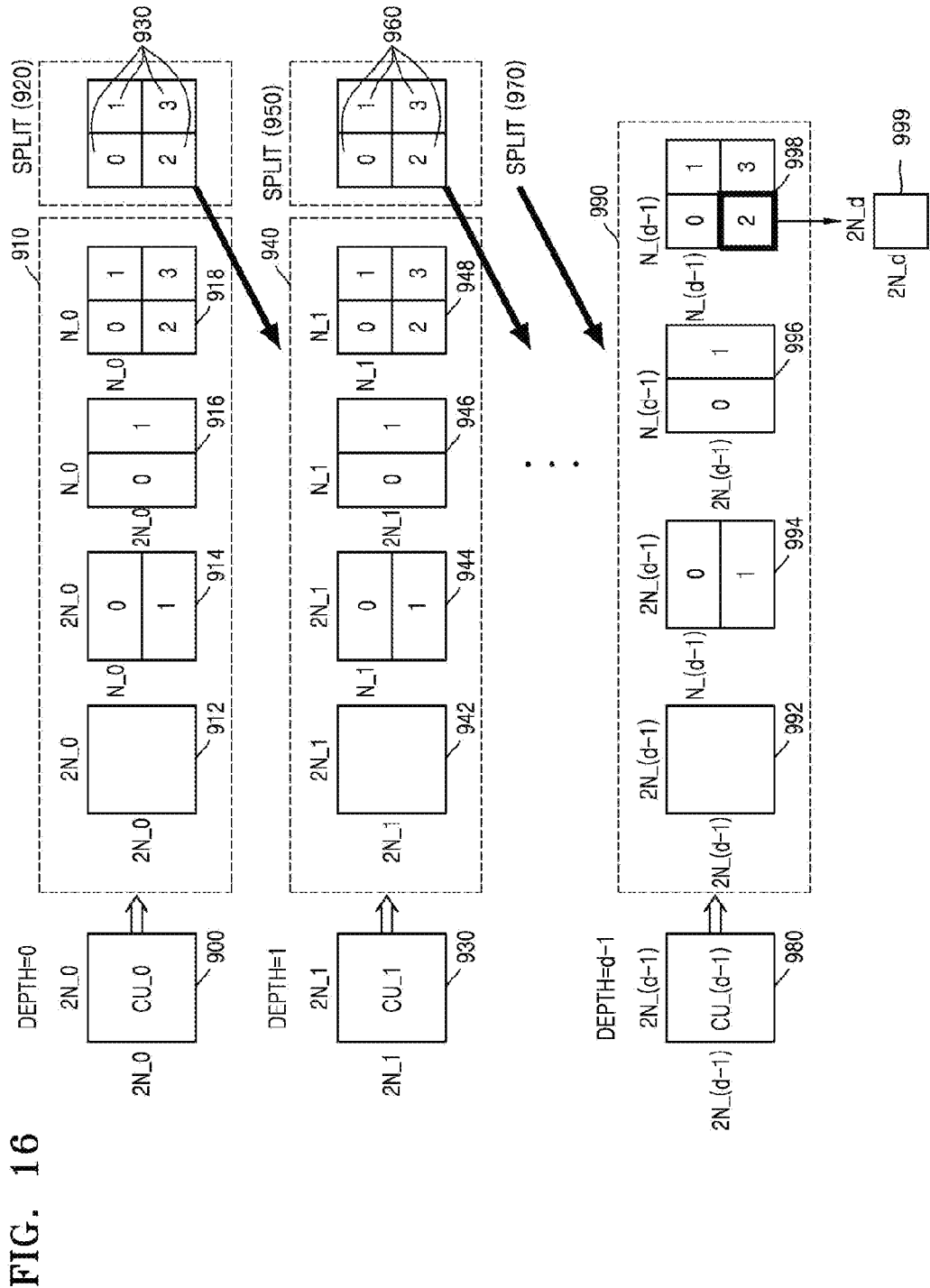
FIG. 16 is a diagram illustrating deeper coding units according to depths according to an exemplary embodiment.

FIG. 16 is a diagram illustrating deeper coding units according to depths according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0× N_0, a partition type 916 having a size of N_0×2N_0, and a partition type 918 having a size of N_0×N_0. FIG. 16 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0× 2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current LCU 900 is determined to be d−1 and a partition type of the current LCU 900 may be determined to be N_(d−1)×N_(d−1). Since the maximum depth is d and a minimum coding unit 980 having a lowermost depth of d−1 is no longer split to a lower depth, split information for the minimum coding unit 980 is not set.

A data unit 999 may be a 'minimum unit' for the current LCU. A minimum unit according to an exemplary embodiment may be a square data unit obtained by splitting a minimum coding unit 980 by 4. By performing the encoding repeatedly, the video encoding apparatus 100 according to an exemplary embodiment may select a depth having the least encoding error by comparing encoding errors according to depths of the coding unit 900 to determine a coded depth, and set a corresponding partition type and a prediction mode as a coding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about a coding mode. Since a coding unit is split from a depth of 0 to a coded depth, only split information of the coded depth is set to 0, and split information of depths excluding the coded depth is set to 1.

The image data and encoding information extractor 220 of the video decoding apparatus 200 according to an exemplary embodiment may extract and use the information about the coded depth and the prediction unit of the coding unit 900 to decode the partition 912. The video decoding apparatus 200 according to an exemplary embodiment may determine a depth, in which split information is 0, as a coded depth by using split information according to depths, and use information about a coding mode of the corresponding depth for decoding.

Figure 17:
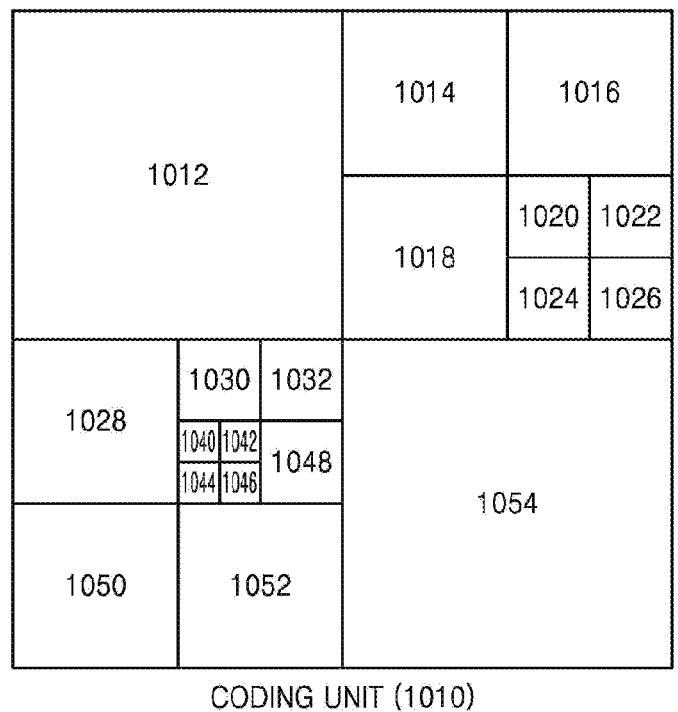
FIGS. 17 through 19 are diagrams for explaining a relationship between coding units, prediction units, and transformation units, according to an exemplary embodiment.
Figure 18:
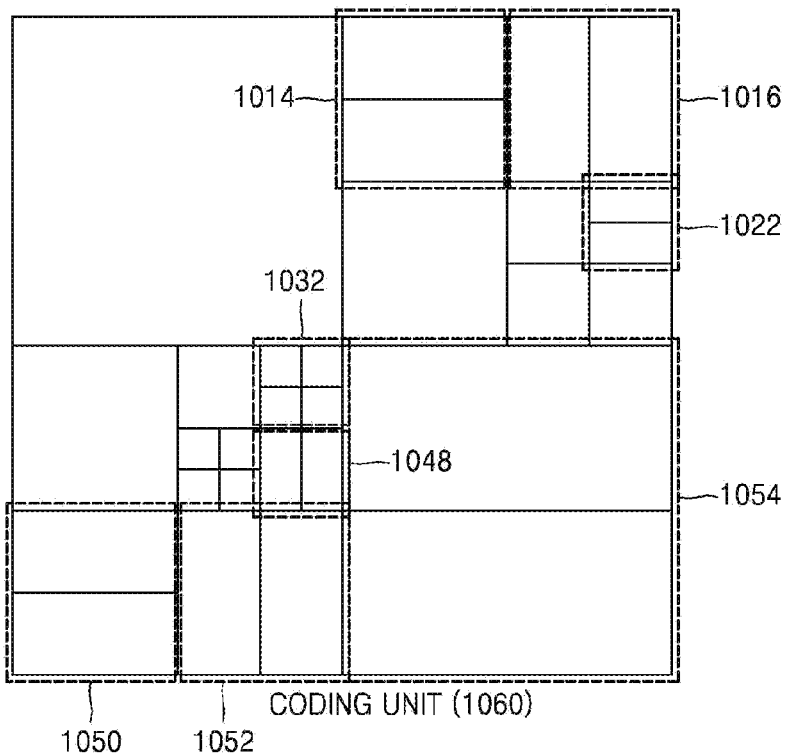
Figure 19:
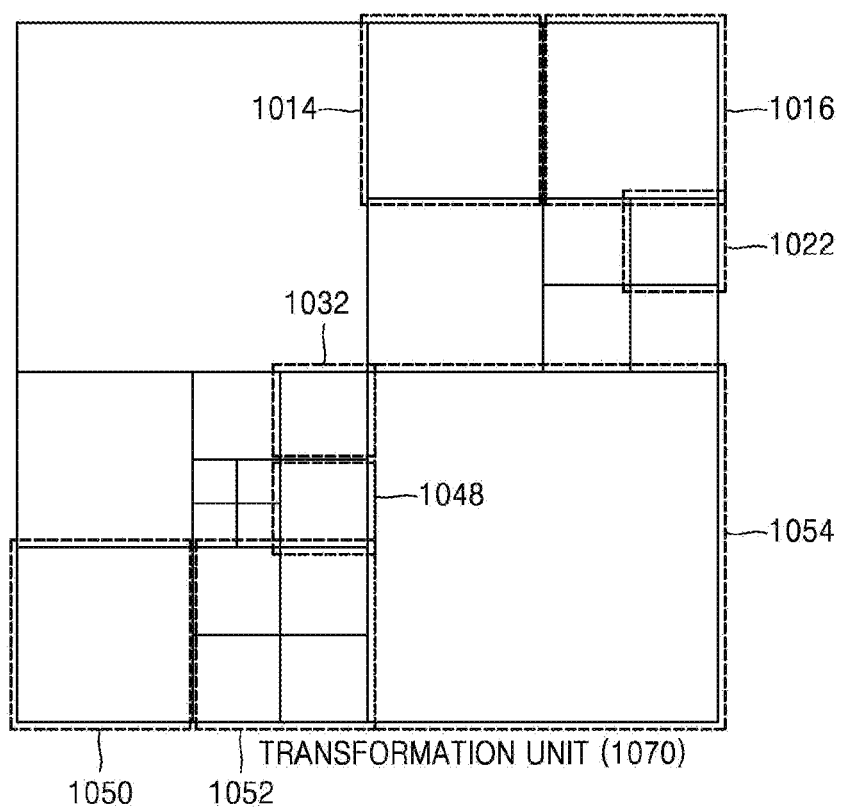

FIGS. 17 through 19 are diagrams for explaining a relationship between coding units 1010, prediction units 1060, and transformation units 1070 according to an exemplary embodiment.

The coding units 1010 are coding units having a tree structure, corresponding to coded depths determined by the video encoding apparatus 100 according to an exemplary embodiment, in an LCU. The prediction units 1060 are partitions of prediction units of each of the coding units 1010, and the transformation units 1070 are transformation units of each of the coding units 1010.

When a depth of an LCU is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. The coding units 1014, 1016, 1022, 1032, 1048, 1050, 1052, and 1054 in the transformation units 1070 are different from those in the prediction units 1060 in terms of sizes and shapes. In other words, the video encoding apparatus 100 according to an exemplary embodiment and the video decoding apparatus 200 according to an exemplary embodiment may perform intra prediction, motion estimation, motion compensation, transformation, and inverse transformation individually on a data unit in the same coding unit.

Accordingly, encoding is recursively performed on each of coding units having a hierarchical structure in each region of an LCU to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding apparatus 100 according to an exemplary embodiment and the video decoding apparatus 200 according to an exemplary embodiment.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | |
| Intra Inter Skip (Only 2N × 2N) | Symmetrical Partition Type | Asymmetrical Partition Type | Split Information 0 of Transformation Unit | Split Information 1 of Transformation Unit | Repeatedly Encode Coding Units having Lower Depth of d + 1 |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the video encoding apparatus 100 according to an exemplary embodiment may output the encoding information about the coding units having a tree structure, and the image data and encoding information extractor 220 of the video decoding apparatus 200 according to an exemplary embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Further, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure according to an exemplary embodiment may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. A corresponding coding unit corresponding to a coded depth is determined by using encoding information of a data unit, and thus a distribution of coded depths in an LCU may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 20:
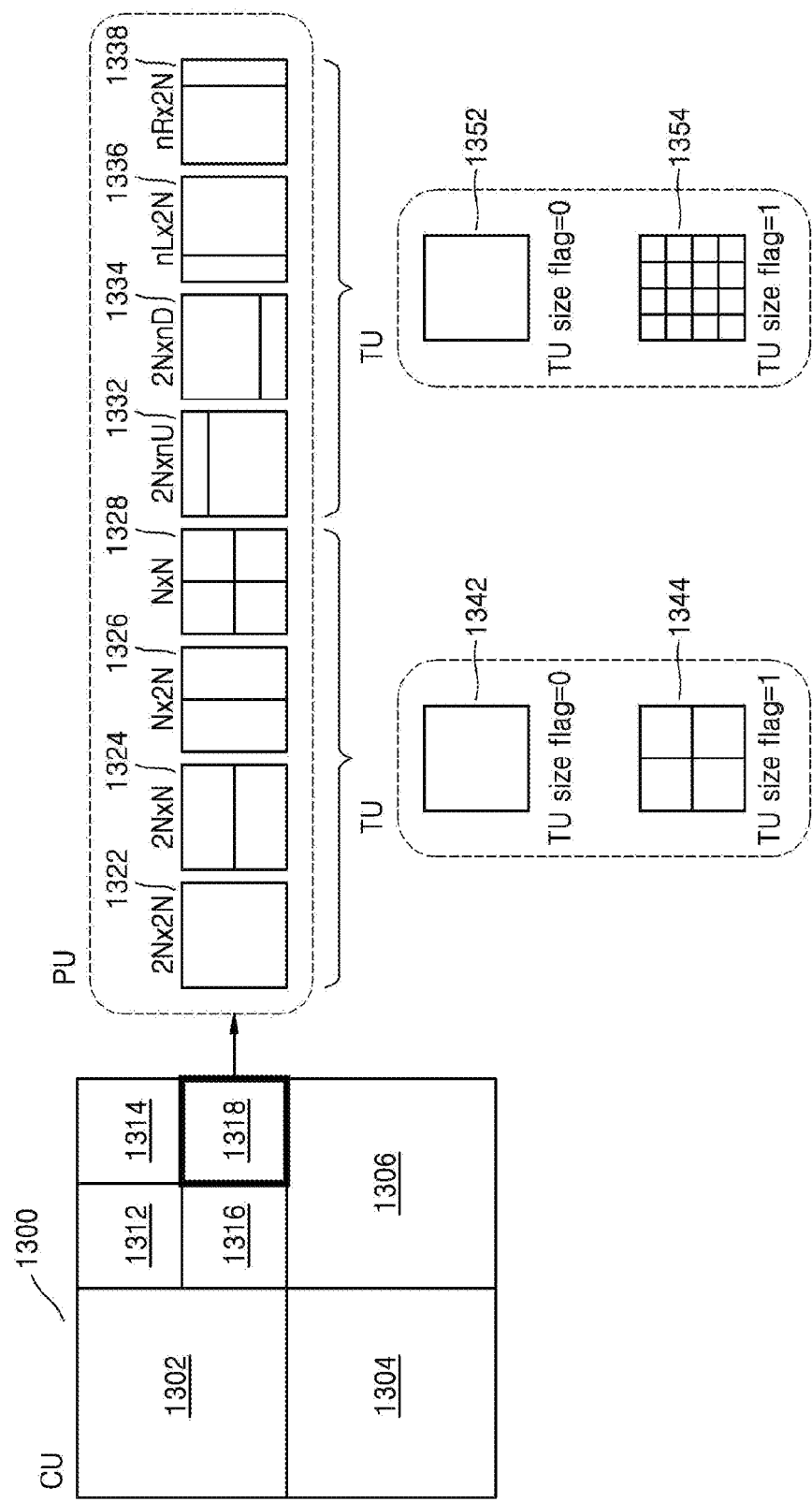
FIG. 20 is a diagram for explaining a relationship between a coding unit, a prediction unit, and a transformation unit according to coding mode information of Table 1.

FIG. 20 is a diagram for explaining a relationship between a coding unit, a prediction unit, and a transformation unit according to coding mode information of Table 1.

An LCU 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a type of a transformation index. The size of the transformation unit corresponding to the transformation index may be changed according to a prediction unit type or a partition type of the coding unit.

For example, when the partition type is set to be symmetrical, i.e. the partition type 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 20, the TU size flag is a flag having a value or 0 or 1, but the TU size flag is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an exemplary embodiment, together with a maximum size and minimum size of the transformation unit. The video encoding apparatus 100 according to an exemplary embodiment is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 according to an exemplary embodiment may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and an exemplary embodiment is not limited thereto.

According to the video encoding method based on coding units having a tree structure as described with reference to FIGS. 8 through 20, image data of a spatial domain is encoded for each of coding units having a tree structure. According to the video decoding method based on coding units having a tree structure, decoding is performed for each LCU to restore image data of a spatial domain. Thus, a picture and a video that is a picture sequence may be restored. The restored video may be reproduced by a reproducing apparatus, stored in a storage medium, or transmitted through a network.

The exemplary embodiments may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

For convenience of explanation, the video encoding method involving the entropy encoding method described with reference to FIGS. 1A through 20, will be collectively referred to as a 'video encoding method according to an exemplary embodiment'. In addition, the video decoding method involving the entropy decoding method described with reference to FIGS. 1A through 20, will be collectively referred to as a 'video decoding method according to an exemplary embodiment'.

The video encoding apparatus 100 including the entropy encoding apparatus 10 and a video encoding apparatus including the image encoder 400 described with reference to FIGS. 1A through 20 will be referred to as a 'video encoding apparatus according to an exemplary embodiment'. In addition, the video decoding apparatus 200 including the entropy decoding apparatus 20 and the image decoder 500 been descried with reference to FIGS. 1A through 20 will be referred to as a 'video decoding apparatus according to an exemplary embodiment'.

A computer-readable recording medium storing a program, e.g., a disc 26000, according to an exemplary embodiment will now be described in detail.

Figure 21:
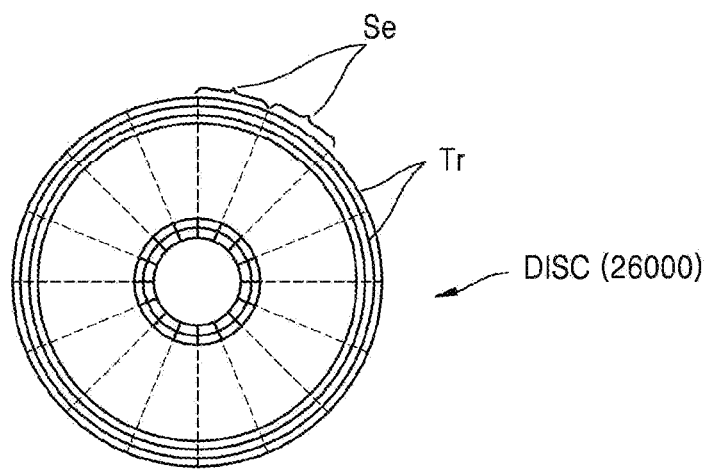
FIG. 21 is a diagram illustrating a physical structure of a disc in which a program is stored according to an exemplary embodiment.

FIG. 21 is a diagram illustrating a physical structure of the disc 26000 in which a program is stored according to an exemplary embodiment. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantization parameter determination method, the video encoding method and the video decoding method described above may be assigned and stored.

A computer system embodied using a storage medium that stores a program for executing the video encoding method and the video decoding method as described above will now be described with reference to FIG. 22.

Figure 22:
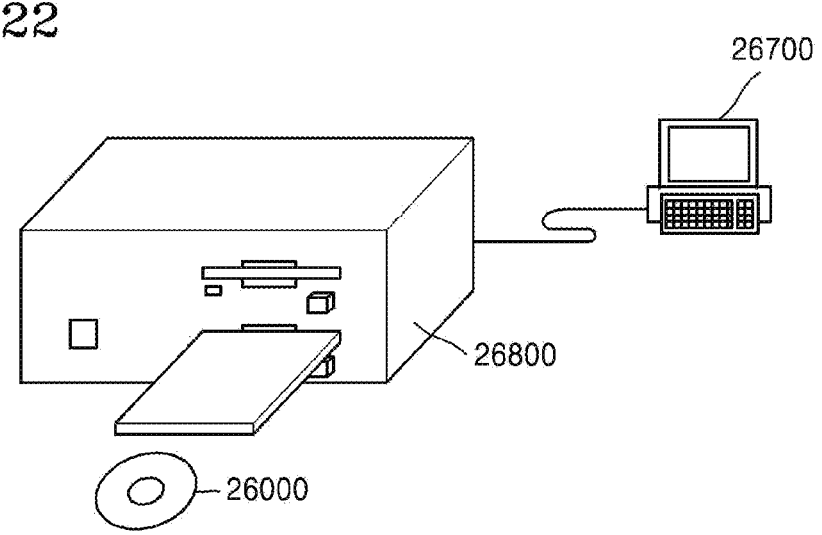
FIG. 22 is a diagram illustrating a disc drive for recording and reading a program by using the disc.

FIG. 22 is a diagram illustrating a disc drive 26800 for recording and reading a program by using the disc 26000. A computer system 27000 may store a program that executes at least one of a video encoding method and a video decoding method according to an exemplary embodiment, in the disc 26000 via the disc drive 26800. To run the program stored in the disc 26000 in the computer system 27000, the program may be read from the disc 26000 and be transmitted to the computer system 26700 by using the disc drive 26800.

The program that executes at least one of a video encoding method and a video decoding method according to an exemplary embodiment may be stored not only in the disc 26000 illustrated in FIG. 21 or 22 but also in a memory card, a ROM cassette, or a solid state drive (SSD).

A system to which the video encoding method and a video decoding method described above are applied will be described below.

Figure 23:
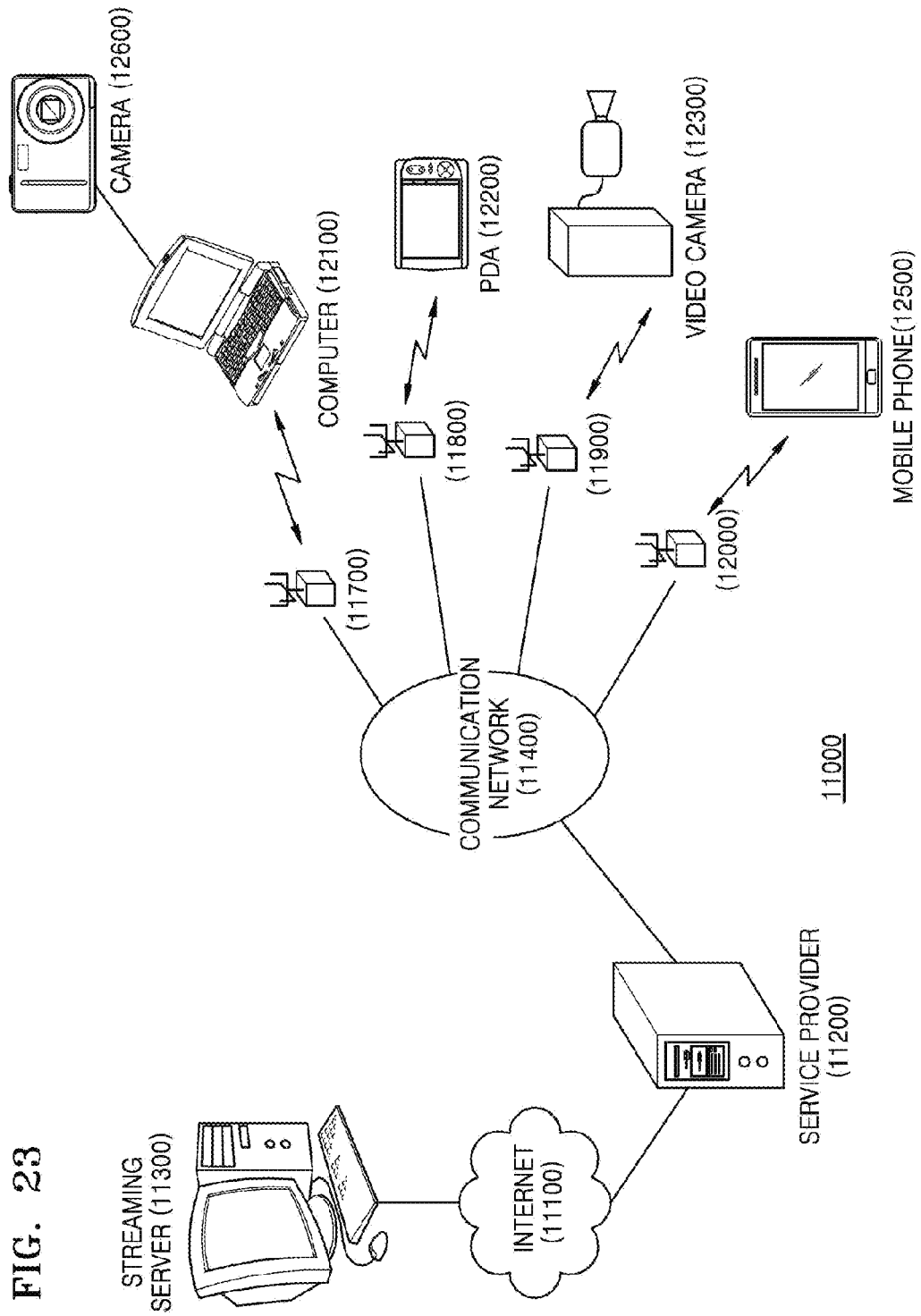
FIG. 23 is a diagram illustrating an overall structure of a content supply system for providing a content distribution service.

FIG. 23 is a diagram illustrating an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
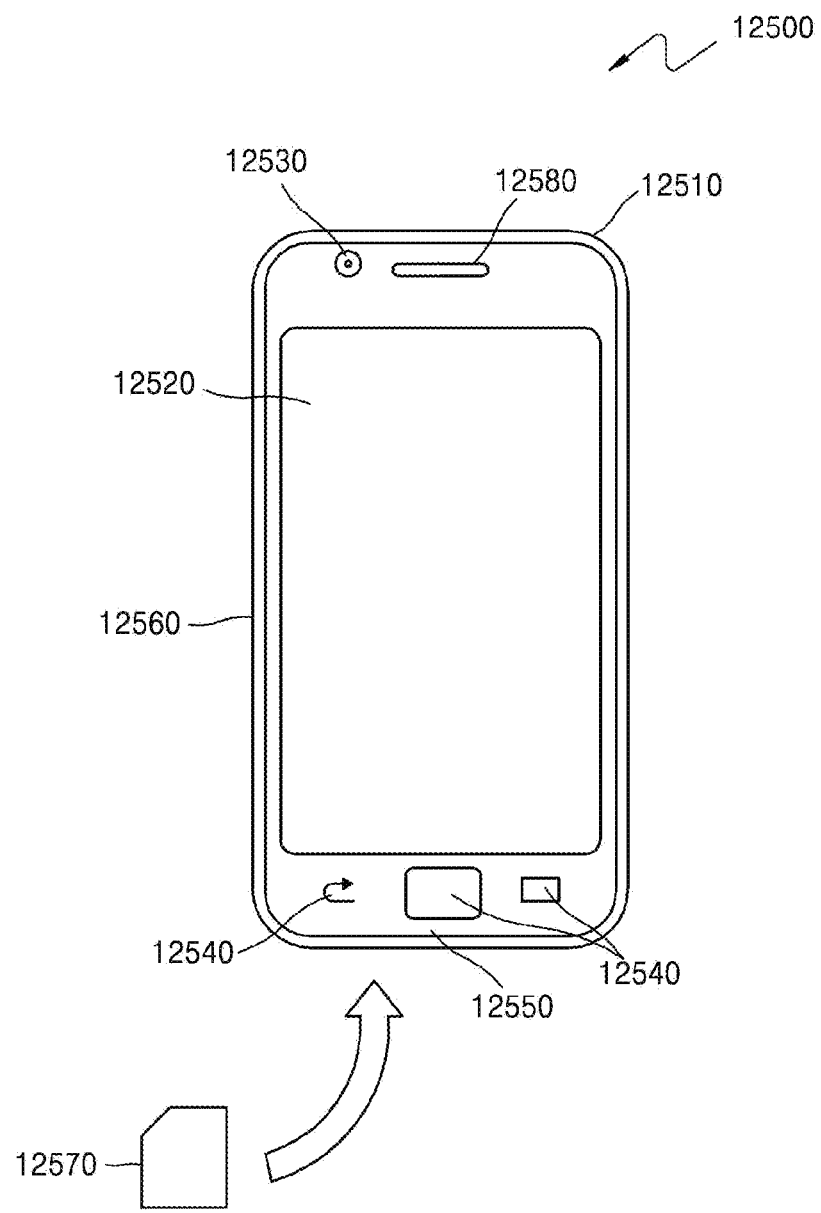
FIGS. 24 and 25 are diagrams illustrating an external structure and an internal structure of a mobile phone to which a video encoding method and a video decoding method according to an exemplary embodiment are applied according to an exemplary embodiment.

However, the content supply system 11000 is not limited to as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. The content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to an exemplary embodiment.

The mobile phone 12500 included in the content supply system 11000 according to an exemplary embodiment will now be described in greater detail with reference to FIGS. 24 and 25.

FIG. 24 is a diagram illustrating an external structure of the mobile phone 12500 to which a video encoding method and a video decoding method according to an exemplary embodiment are applied according to an exemplary embodiment. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound output unit, and a microphone 12550 for inputting voice and sound or another type sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
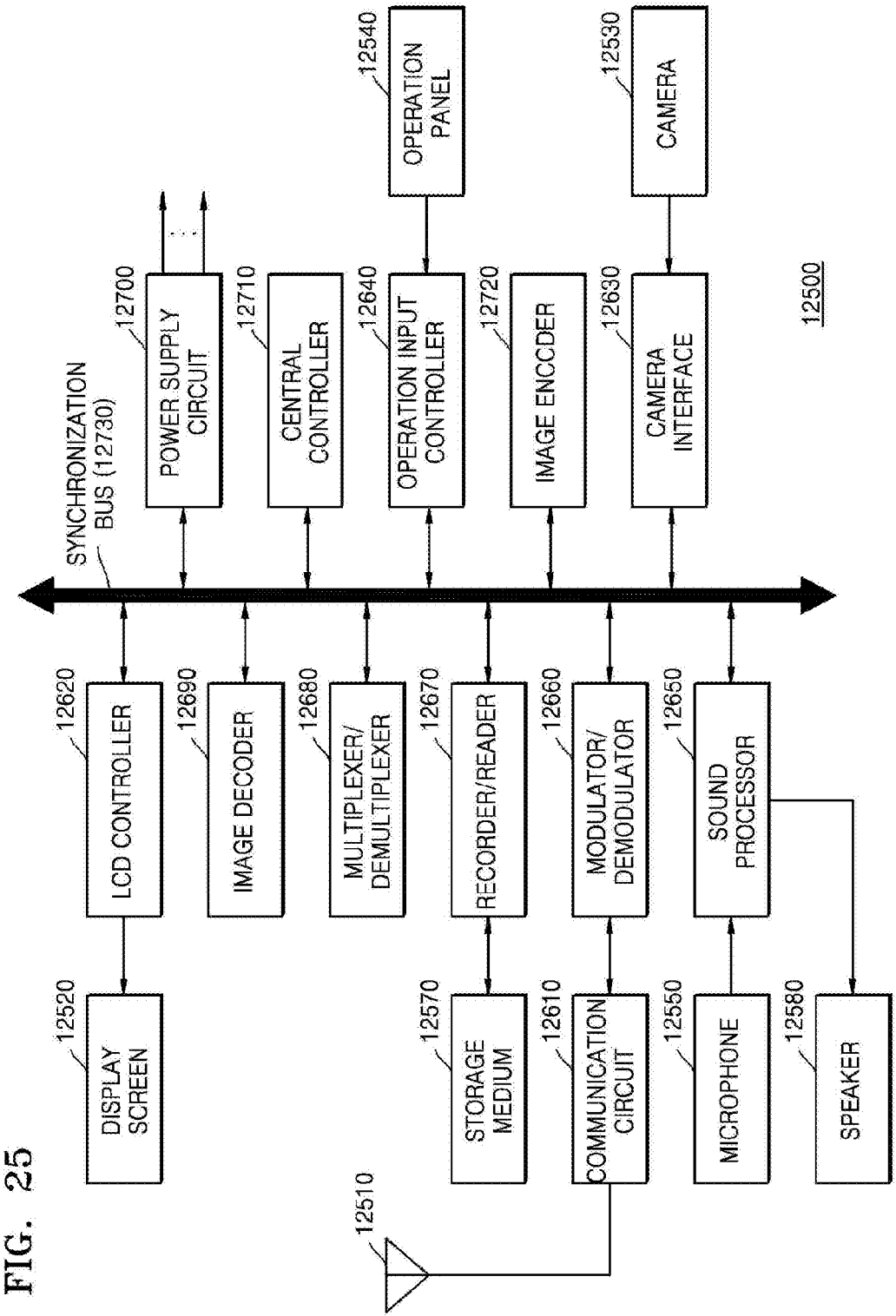

FIG. 25 is a diagram illustrating an internal structure of the mobile phone 12500. To systemically control parts of the mobile phone 12500 including the display screen 12520 and the operation panel 12540, a power supply circuit 12700, an operation input controller 12640, an image encoding unit 12720, a camera interface 12630, an LCD controller 12620, an image decoding unit 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoding unit 12720 may generate a digital image signal, and text data of a message may be generated via the operation panel 12540 and the operation input controller 12640. When a digital signal is transmitted to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless base station 12000 via the antenna 12510.

To transmit image data in the data communication mode, image data captured by the camera 12530 is provided to the image encoding unit 12720 via the camera interface 12630. The captured image data may be directly displayed on the display screen 12520 via the camera interface 12630 and the LCD controller 12620.

A structure of the image encoding unit 12720 may correspond to that of the video encoding apparatus 100 described above. The image encoding unit 12720 may transform the image data received from the camera 12530 into compressed and encoded image data according to a video encoding method employed by the video encoding apparatus 100 or the image encoder 400 described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoding unit 12690 may correspond to that of the video decoding apparatus according to an exemplary embodiment. The image decoding unit 12690 may decode the encoded video data to obtain restored video data and provide the restored video data to the display screen 1252 via the LCD controller 1262 according to the video decoding method according to an exemplary embodiment.

Thus, the data of the video file accessed at the Internet website may be displayed on the display screen 1252. At the same time, the sound processor 1265 may transform audio data into an analog sound signal, and provide the analog sound signal to the speaker 1258. Thus, audio data contained in the video file accessed at the Internet website may also be reproduced via the speaker 1258.

The mobile phone 1250 or another type of communication terminal may be a transceiving terminal including both a video encoding apparatus and a video decoding apparatus according to an exemplary embodiment, may be a transceiving terminal including only the video encoding apparatus according to an exemplary embodiment, or may be a transceiving terminal including only the video decoding apparatus according to an exemplary embodiment.

Figure 26:
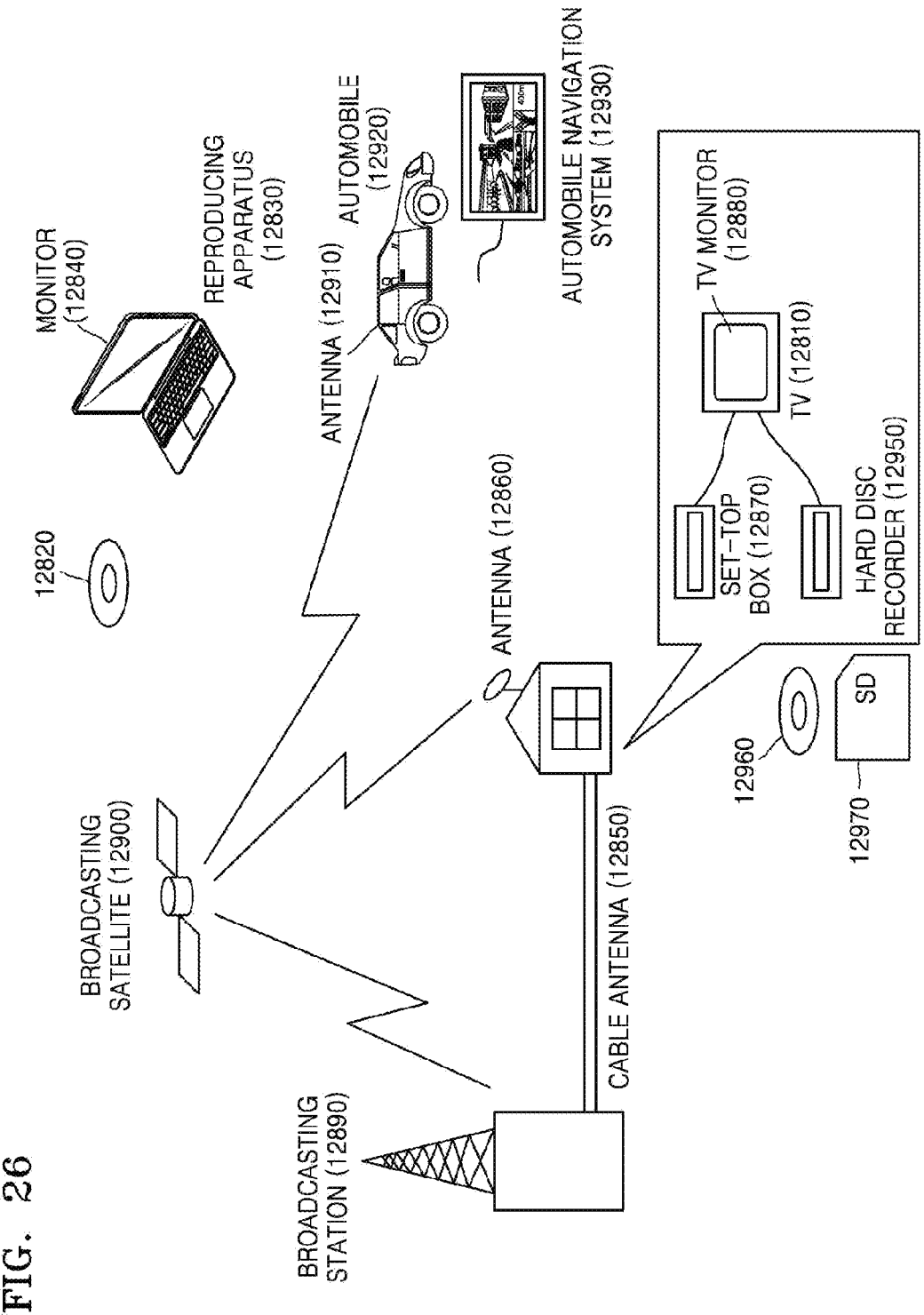
FIG. 26 is a diagram illustrating a digital broadcasting system to which a communication system is applied according to an exemplary embodiment.

A communication system according to an exemplary embodiment is not limited to the communication system described above with reference to FIG. 24. For example, FIG. 26 is a diagram illustrating a digital broadcasting system employing a communication system according to an exemplary embodiment. The digital broadcasting system of FIG. 26 may receive a digital broadcast transmitted via a satellite or a terrestrial network by using a video encoding apparatus and a video decoding apparatus according to an exemplary embodiment.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to an exemplary embodiment is implemented in a reproducing apparatus 12830, the reproducing apparatus 12830 may parse and decode an encoded video stream recorded on a storage medium 12820, such as a disc or a memory card to restore digital signals. Thus, the restored video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to an exemplary embodiment may be installed. Data output from the set-top box 12870 may also be reproduced on a TV monitor 12880.

As another example, a video decoding apparatus according to an exemplary embodiment may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by a video encoding apparatus according to an exemplary embodiment and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to an exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoding unit 12720 of FIG. 26. For example, the computer 12100 and the TV receiver 12810 may not be included in the camera 12530, the camera interface 12630, and the image encoding unit 12720 of FIG. 26.

FIG. 27 is a diagram illustrating a network structure of a cloud computing system using a video encoding apparatus and a video decoding apparatus according to an exemplary embodiment.

The cloud computing system may include a cloud computing server 14100, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14100 via a data communication network including the Internet and a mobile telecommunication network. User terminals may be provided cloud computing services, and particularly video reproduction services, from the cloud computing server 14100. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14100, a process of reproducing video by decoding the video data stream is similar to an operation of the mobile phone 12500 described above with reference to FIG. 24.

The cloud computing server 14100 may refer to a reproduction history of a desired video service, stored in the user DB 14100. For example, the cloud computing server 14100 receives a request to reproduce a video stored in the user DB 14100, from a user terminal. If this video was being reproduced, then a method of streaming this video, performed by the cloud computing server 14100, may vary according to the request from the user terminal, i.e., according to whether the video will be reproduced, starting from a start thereof or a pausing point thereof. For example, if the user terminal requests to reproduce the video, starting from the start thereof, the cloud computing server 14100 transmits streaming data of the video starting from a first frame thereof to the user terminal. If the user terminal requests to reproduce the video, starting from the pausing point thereof, the cloud computing server 14100 transmits streaming data of the video starting from a frame corresponding to the pausing point, to the user terminal.

In this case, the user terminal may include a video decoding apparatus as described above with reference to FIGS. 1A to 20. As another example, the user terminal may include a video encoding apparatus as described above with reference to FIGS. 1A to 20. Alternatively, the user terminal may include both the video decoding apparatus and the video encoding apparatus as described above with reference to FIGS. 1A to 20.

Various applications of a video encoding method, a video decoding method, a video encoding apparatus, and a video decoding apparatus according to an exemplary embodiment described above with reference to FIGS. 1A to 20 have been described above with reference to FIGS. 21 to 27. However, methods of storing the video encoding method and the video decoding method in a storage medium or methods of implementing the video encoding apparatus and the video decoding apparatus in a device, according to various exemplary embodiments, are not limited to the embodiments described above with reference to FIGS. 21 to 27.

While exemplary embodiments have been particularly shown and described with reference to the drawings by using specific terms, the exemplary embodiments and terms have merely been used for explanation and should not be construed as limiting the scope of the inventive concept as defined by the claims. The exemplary embodiments should be considered in a descriptive sense only and not for purposes of limitation. Therefore, the scope of the inventive concept is defined not by the detailed description but by the appended claims, and all differences within the scope will be construed as being included in the inventive concept.

The invention claimed is:

1. A video decoding method comprising:
obtaining, from a bitstream, information about a maximum size of a coding unit;
obtaining, from the bitstream, first information indicating whether a dependent slice segment is permitted to be included in a picture;
determining at least one maximum coding unit included in a first slice segment, based on a maximum coding unit size, which is determined by using the information about the maximum size;
obtaining, from the bitstream, second information indicating whether a current maximum coding unit is at an end of the first slice segment;
determining a number of entry points of subsets, which are included in the first slice segment, based on third information obtained from a slice segment header of the bitstream;
determining positions of the entry points based on fourth information obtained from the slice segment header, which indicates a number that is less by 1 than an offset of the entry points; and
storing a context variable of the first slice segment if the first information indicates that a dependent slice segment is permitted to be included in the picture and the second information indicates that the current maximum coding unit is at the end of the first slice segment, wherein the number and the positions of the entry points are determined if a plurality of tiles are included in the picture or synchronization can be performed for context variables of the current maximum coding unit included in the picture.

2. The video decoding method of claim 1, wherein the storing the context variable comprises storing context variables of the current maximum coding unit if the dependent slice segment is permitted to be included in the picture.

3. The video decoding method of claim 1, wherein the storing the context variable comprises storing a context variable of the current maximum coding unit finally decoded in the first slice segment if the second information indicates that the current maximum coding unit is at the end of the first slice segment.

4. The video decoding method of claim 1, further comprising
determining whether a dependent slice segment of the picture is permitted to be included in the picture based on the first information obtained from a picture parameter set of the bitstream;
determining whether the current maximum coding unit is a final maximum coding unit based on the second information obtained from data of the current maximum coding unit among data of each of slice segments of the bitstream; and
obtaining a bin string from the data of the current maximum coding unit.

* * * * *